(12) United States Patent
Miller

(10) Patent No.: US 10,457,295 B2
(45) Date of Patent: Oct. 29, 2019

(54) TRANSPORTATION SYSTEM AND VEHICLE FOR SUPERSONIC TRANSPORT

(71) Applicant: Supersonic Tubevehicle LLC, Golden, CO (US)

(72) Inventor: Arnold R. Miller, Lakewood, CO (US)

(73) Assignee: Supersonic Tubevehicle LLC, Golden, CO (US)

( * ) Notice: Subject to any disclaimer, the term of this patent is extended or adjusted under 35 U.S.C. 154(b) by 330 days.

(21) Appl. No.: 15/165,507

(22) Filed: May 26, 2016

(65) Prior Publication Data

US 2017/0197639 A1 Jul. 13, 2017

Related U.S. Application Data

(63) Continuation of application No. 14/015,796, filed on Aug. 30, 2013, which is a continuation-in-part of
(Continued)

(51) Int. Cl.
*B61B 13/10* (2006.01)
*B61D 17/02* (2006.01)
(Continued)

(52) U.S. Cl.
CPC ............. *B61B 13/10* (2013.01); *B60L 9/24* (2013.01); *B60L 9/28* (2013.01); *B60L 13/04* (2013.01); *B60L 58/30* (2019.02); *B60L 58/40* (2019.02); *B61B 13/08* (2013.01); *B61C 3/00* (2013.01); *B61C 11/06* (2013.01); *B61C 17/00* (2013.01); *B61C 17/06* (2013.01); *B61D 17/02* (2013.01); *H01M 8/04164* (2013.01); *H01M 8/04201* (2013.01); *H01M 8/0618* (2013.01);

*B60L 2200/26* (2013.01); *B60L 2220/14* (2013.01); *B60L 2240/12* (2013.01);
(Continued)

(58) Field of Classification Search
CPC ....... B61B 13/10; B61B 13/122; B65G 51/08; B65G 51/04
USPC .................................................. 104/245, 246
See application file for complete search history.

(56) References Cited

U.S. PATENT DOCUMENTS 3,404,638 A * 10/1968 Edwards ............... B61B 13/122 104/138.1
3,730,103 A * 5/1973 Weaver .................. B61B 13/04 105/141

(Continued)

FOREIGN PATENT DOCUMENTS

| AT | 401 825 | * | 12/1996 |
| DE | 3925333 | * | 7/1991 |
| KR | 2002 0076506 | * | 10/2002 |

OTHER PUBLICATIONS

DE3925333 (English translaton) (Year: 1991).*

*Primary Examiner* — Mark T Le
(74) *Attorney, Agent, or Firm* — Polsinelli PC

(57) ABSTRACT

A transportation system for supersonic travel including a conduit containing an atmosphere that exhibits high aerodynamic tunneling performance, or high gas efficacy, and a vehicle designed to operate within the conduit. The vehicle traveling within the conduit along a support and guide structure that is complementary to a support and guidance system of the vehicle. The vehicle being propelled through the conduit via a propulsion system that includes contra-rotating propellers.

14 Claims, 16 Drawing Sheets

Related U.S. Application Data application No. 12/698,887, filed on Feb. 2, 2010, now Pat. No. 8,534,197.

(60) Provisional application No. 61/695,983, filed on Aug. 31, 2012, provisional application No. 61/840,232, filed on Jun. 27, 2013.

(51) Int. Cl.
| | |
|---|---|
| *B61C 11/06* | (2006.01) |
| *B60L 13/04* | (2006.01) |
| *B60L 9/28* | (2006.01) |
| *B60L 9/24* | (2006.01) |
| *B61B 13/08* | (2006.01) |
| *B61C 3/00* | (2006.01) |
| *B61C 17/00* | (2006.01) |
| *B61C 17/06* | (2006.01) |
| *H01M 8/04119* | (2016.01) |
| *H01M 8/04082* | (2016.01) |
| *H01M 8/0612* | (2016.01) |
| *B60L 58/30* | (2019.01) |
| *B60L 58/40* | (2019.01) |

(52) U.S. Cl.
CPC .......... *H01M 2250/20* (2013.01); *Y02T 90/32* (2013.01); *Y02T 90/34* (2013.01)

(56) References Cited

U.S. PATENT DOCUMENTS

| | | | | |
|---|---|---|---|---|
| 3,861,319 | A * | 1/1975 | Gelhard | B61B 13/10 104/123 |
| 4,881,469 | A * | 11/1989 | Hirtz | B61B 13/10 104/138.1 |
| 5,275,111 | A * | 1/1994 | Saviccevic | B61B 13/10 104/121 |
| 5,282,424 | A * | 2/1994 | O'Neill | B61B 13/10 104/138.1 |
| 8,146,508 | B2 * | 4/2012 | Flynn | B61B 13/10 104/138.1 |

* cited by examiner

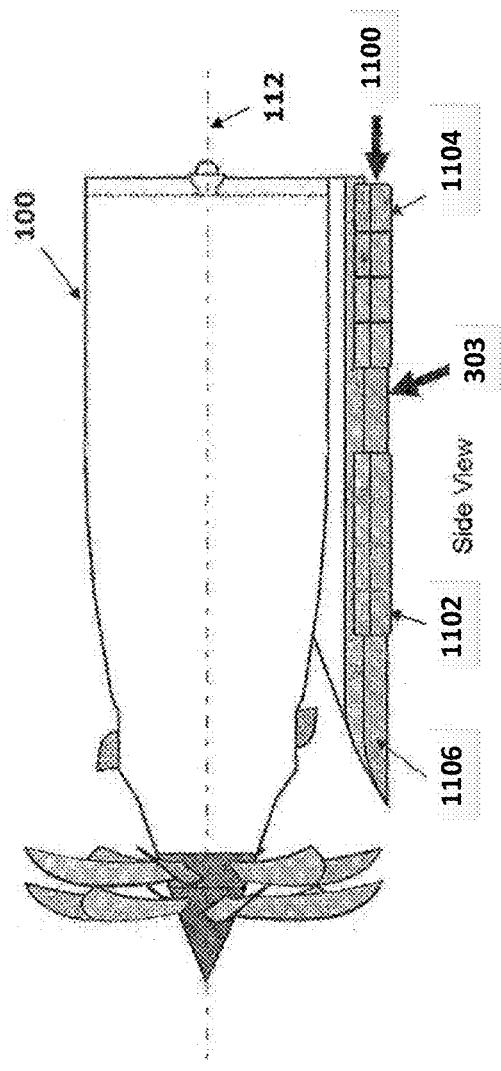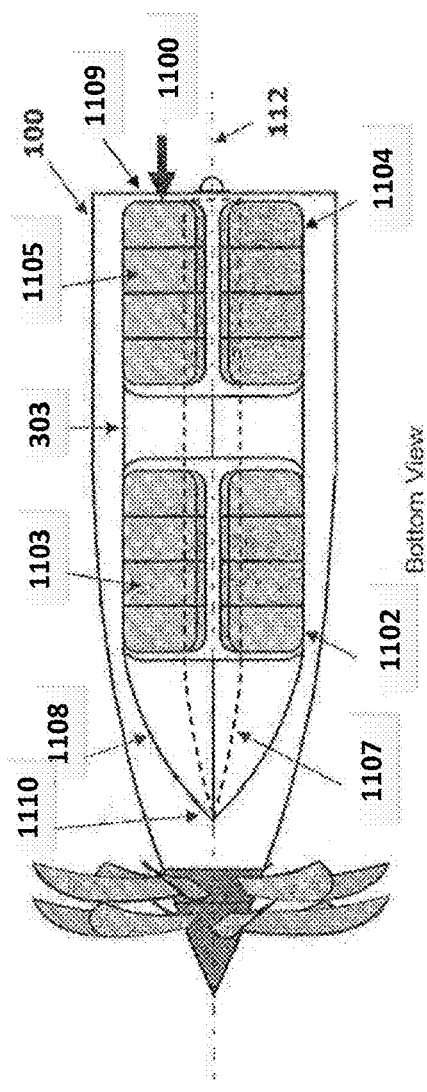
Fig. 11A / Fig. 11B

TRANSPORTATION SYSTEM AND VEHICLE FOR SUPERSONIC TRANSPORT

CROSS-REFERENCE TO RELATED APPLICATIONS

This application is a continuation of U.S. Nonprovisional application Ser. No. 14/015,796 entitled "Transportation System and Vehicle for Supersonic Transport" filed on Aug. 30, 2013, which is a continuation-in-part and claims priority to U.S. Nonprovisional patent application Ser. No. 12/698,887 entitled "Supersonic Hydrogen Tube Vehicle" filed on Feb. 2, 2010, now U.S. Pat. No. 8,534,197 issued on Sep. 17, 2013, which claims priority under 35 U.S.C. § 119(e) to U.S. Provisional Patent Application No. 61/695,983 titled "Tube Vehicle for Supersonic Transport," filed Aug. 31, 2012, and U.S. Provisional Patent Application No. 61/840,232 titled "Tube Vehicle for Supersonic Transport with Wheels and Balancing System," filed Jun. 27, 2013, all of which are hereby incorporated by reference in their entirety for all purposed.

BACKGROUND

There are many ways to transport both people and goods, including airplanes, automobiles, and trains. The length of time that a trip may take is often a determining factor for the type of transportation that may be used, and there is a demand for shorter travel times between destinations. In addition to travel time, many consumers choose their method of transportation based on cost and consumers will often choose one airline carrier over another based on ticket price. The efficiency of a method of transportation plays a big role on costs passed on to consumers. For instance, when the price of aviation fuel increases, some airlines also increase the cost of tickets. Additionally, consumers are more environmentally conscious and are looking to alternative energy modes of transportation when making their transportation decisions.

Business travelers are primarily concerned with speed, and automobiles are not the first choice for long distance travel. Such consumers really have only one travel option: flying. The speed of commercial aircraft, however, is practically limited by the speed of sound, because as an airplane speeds up and begins to approach the speed of sound, it enters a speed region known as the transonic region. When the airplane enters the transonic region, parts of the airflow over the airplane's surface are subsonic and parts are supersonic. Air is strongly compressible near the speed of sound and the supersonic parts emanate shock waves that are approximately normal to the surface of the airplane. The shock waves increase drag (wave drag) and decrease lift. Thus, as the speed of the aircraft varies as it accelerates through the transonic region, movement of the waves on the surface causes buffeting. The wave drag gives rise to a power peak at Mach 1 called the "sound barrier." After the airplane passes through the transonic region, the stability of the vehicle improves and the power requirement drops temporarily below the power peak of the sound barrier. Nonetheless, the power continues to rise with speed and, due to wave drag, is much higher than at subsonic speeds. Indeed, the power in the supersonic region rises at more than the third-power of speed. The additional power requirements make supersonic airplanes prohibitively expensive to build and operate, especially for commercial use. This means that in order to increase their speed past the speed of sound, aircraft must use significantly more fuel, charge higher prices for either passengers or cargo in order to make up for the increases in fuel usage, and will expel more emissions into the environment.

The foregoing examples of the related art and limitations therewith are intended to be illustrative and not exclusive. Other limitations of the related art will become apparent to those of skill in the art upon a reading of the specification and a study of the drawings.

SUMMARY

Aspects of the present disclosure involve a transportation system including a substantially enclosed conduit. The conduit is provided between a first geographic location and a second geographic location. The conduit has a cross-section of a fluted tube and is provided with an atmosphere that allows a vehicle traveling within the conduit to achieve aerodynamic tunneling.

Another aspect of the disclosure involves a vehicle including at least one source of power and a motor operably coupled with the at least one source of power and configured to receive power from the at least one source of power. In one specific example, the at least one source of power includes at least one fuel-cell stack that uses a gas from an atmosphere included in the enclosed structure in which the vehicle travels as a fuel source. The vehicle includes a propulsion system supported on the outside portion of the vehicle body and configured to move the vehicle through the enclosed structure. The propulsion system being operable coupled to the motor. The propulsion system, in one implementation, includes at least one propeller supported at one end of the vehicle. The propeller being configured to operate within an atmosphere of the enclosed structure that allows the vehicle to achieve aerodynamic tunneling.

The following embodiments and aspects thereof are described and illustrated in conjunction with systems, tools, and methods that are meant to be exemplary and illustrative, and the embodiments and aspects described and illustrated are not intended to be limiting in scope. In various embodiments, one or more of the above-described problems have been reduced or eliminated, while other embodiments are directed to other improvements. In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting. The use of the same reference numerals in different drawings indicates similar or identical items.

FIG. 11A is a side view of the vehicle of FIG. 10;

FIG. 11B is a bottom view of the vehicle of FIG. 10;

DETAILED DESCRIPTION

Aspects of the present disclosure involve a vehicle capable of supersonic travel (relative to air outside the conduit) that "flies" in a substantially enclosed conduit provided with an atmosphere that exhibits high aerodynamic (tunneling) performance, such as a hydrogen atmosphere. The conduit is intended to be enclosed and its interior isolated from air outside the conduit as completely as is practicable, up to, for example, flaws in manufacturing or fabrication (e.g., pinholes in welds). The conduit may be of various configurations capable of supporting either unidirectional or bidirectional transit. The vehicle includes one or more fuel cells, rechargeable batteries, an electrical catenary, an electrical bus running parallel to the centerline of the conduit, or other sources of power that power the vehicle. In the case of fuel cells, a gas within the conduit, such as hydrogen or other gases can be used as a fuel source. The fuel cell, rechargeable battery, or other source of power drives a propfan or other propulsion system to propel the vehicle within the conduit. Further, by traveling in an atmosphere with a more aerodynamically favorable performance than air allows the vehicle to travel faster than the speed of sound with respect to the air outside the conduit without exceeding the sound barrier within the atmosphere. Thus, for example, in a hydrogen atmosphere, which has a higher speed of sound than air by a factor of 3.8, a delay in the onset of the sound barrier is observed. Mach 1.2 in air corresponds to only Mach 0.32 in hydrogen. Hence, the vehicle may reach Mach 1.2 (with respect to air) while remaining subsonic in the hydrogen atmosphere. To "fly" the vehicle will involve utilization of a levitation apparatus or a similar type of apparatus that supports and guides the vehicle that cooperates with a guideway or support and guide structure within the conduit such that the vehicle levitates above the guideway or travels along the support and guide structure within the conduit. The levitation or support and guidance apparatus may, for example, include aerostatic gas bearings, magnetic levitation, wheels, or small-diameter rollers, like the rolling elements of roller bearings, or the like. In the case of aerostatic gas bearings, a gas pump may be used to force gas through the bearings to allow the vehicle to hover so that the system does not depend on vehicle-guideway relative velocity to provide gas pressure. At least one embodiment of magnetic levitation, for example, AC-electromagnet levitation, can analogously hover.

Figure 1:
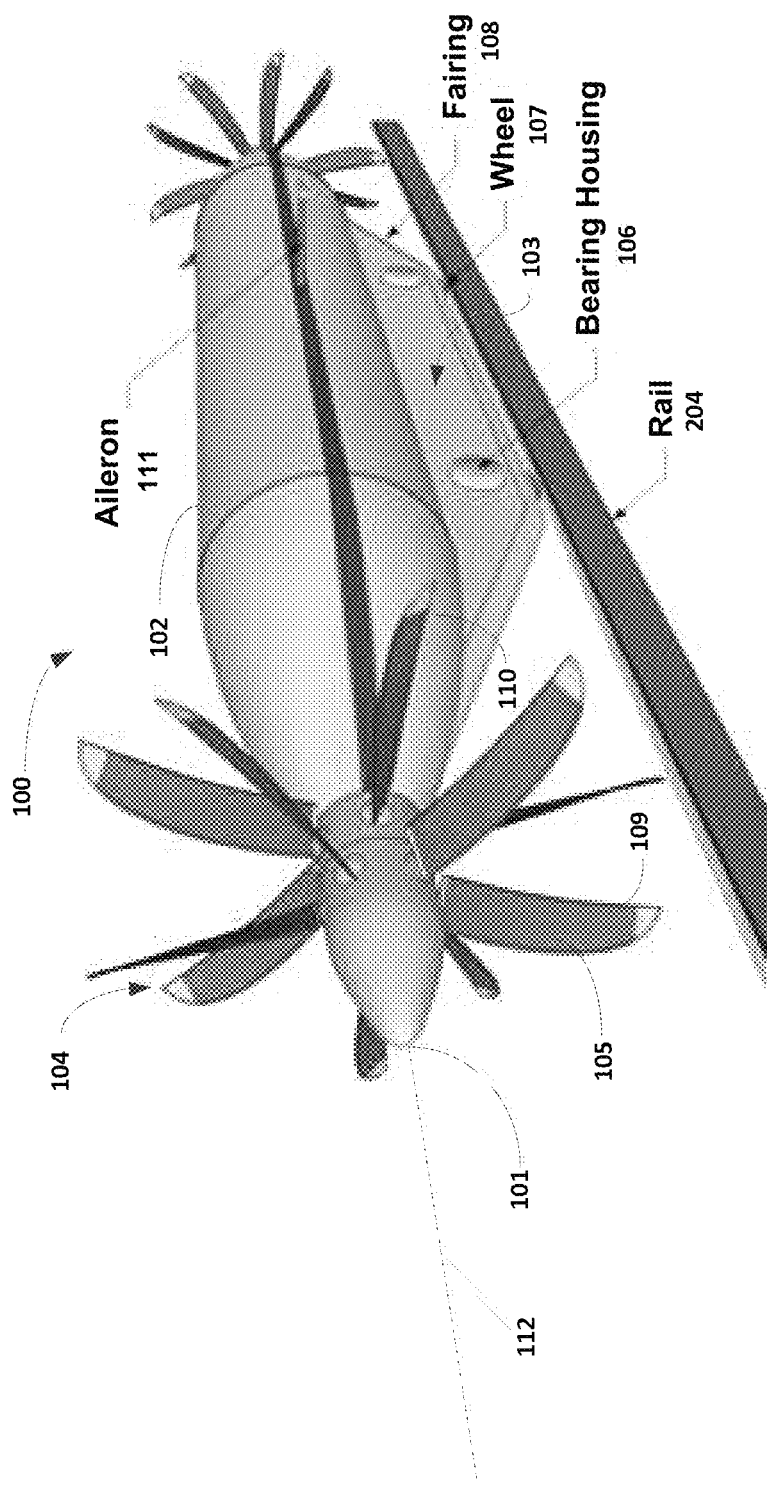
FIG. 1 is a perspective view of a tube vehicle.

FIG. 1 illustrates a perspective view of a vehicle 100 conforming to aspects of the disclosure. The vehicle 100 includes a body 102 supporting and housing various components of the vehicle, including a wheel system 103 and a propulsion system 104. Generally speaking, the body 102 assumes a cone-like aerodynamic shape. Nonetheless, the body 102 may be any shape and similarly may be constructed of any suitable material, including aircraft grade aluminum or carbon-fiber materials. The body 102 is generally cylindrical and tapering to a tip region 101. The propulsion system 104 in this embodiment is provided at the tip region 101 of the vehicle 100. According to one specific example shown in FIG. 1, the vehicle 100 can be a monolithic vehicle, similar to an airplane fuselage and include two tandem propellers 105, one fore and one aft of the vehicle.

Figure 2:
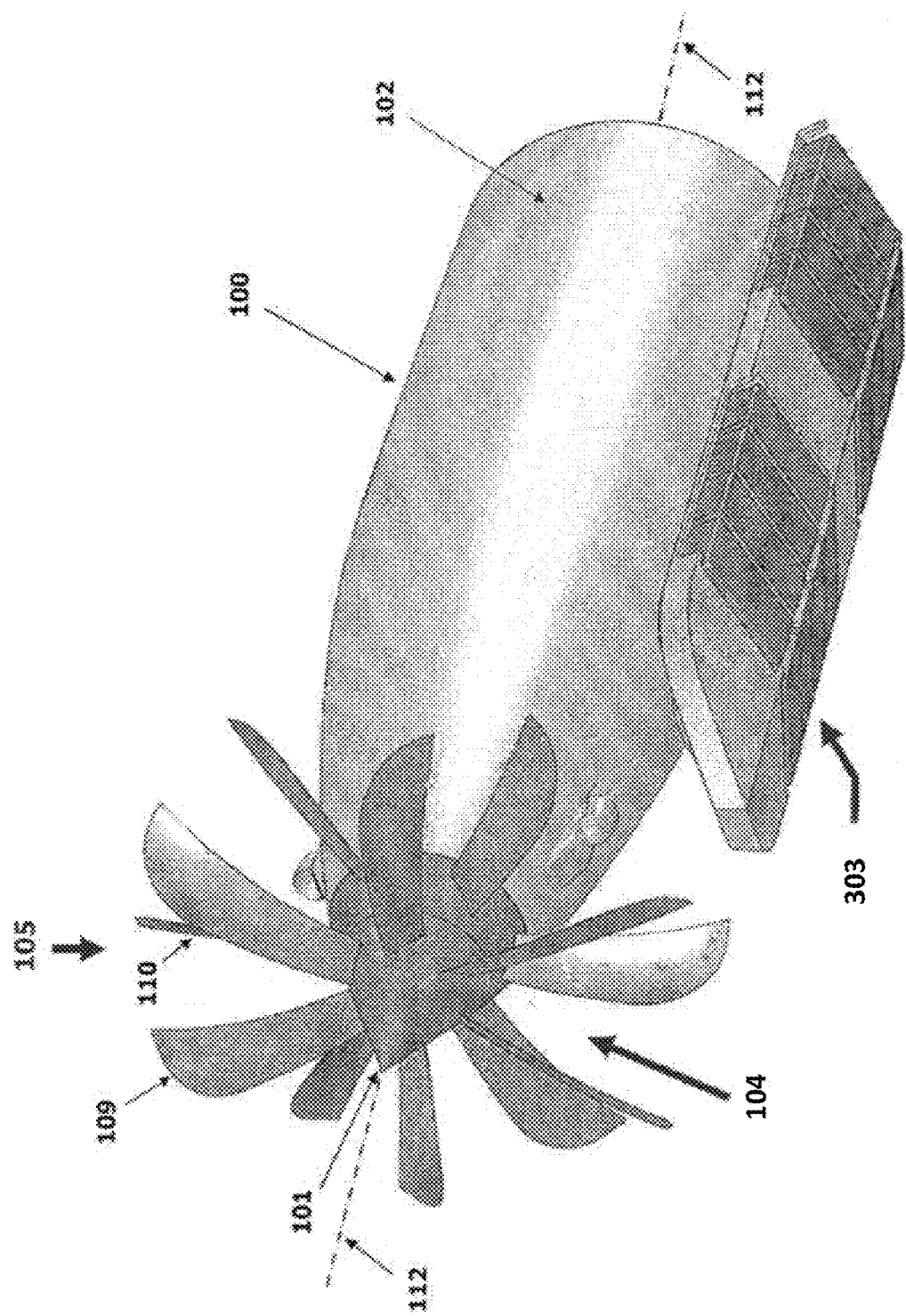
FIG. 2 is a perspective view of a different embodiment of a tube vehicle.
Figure 3:
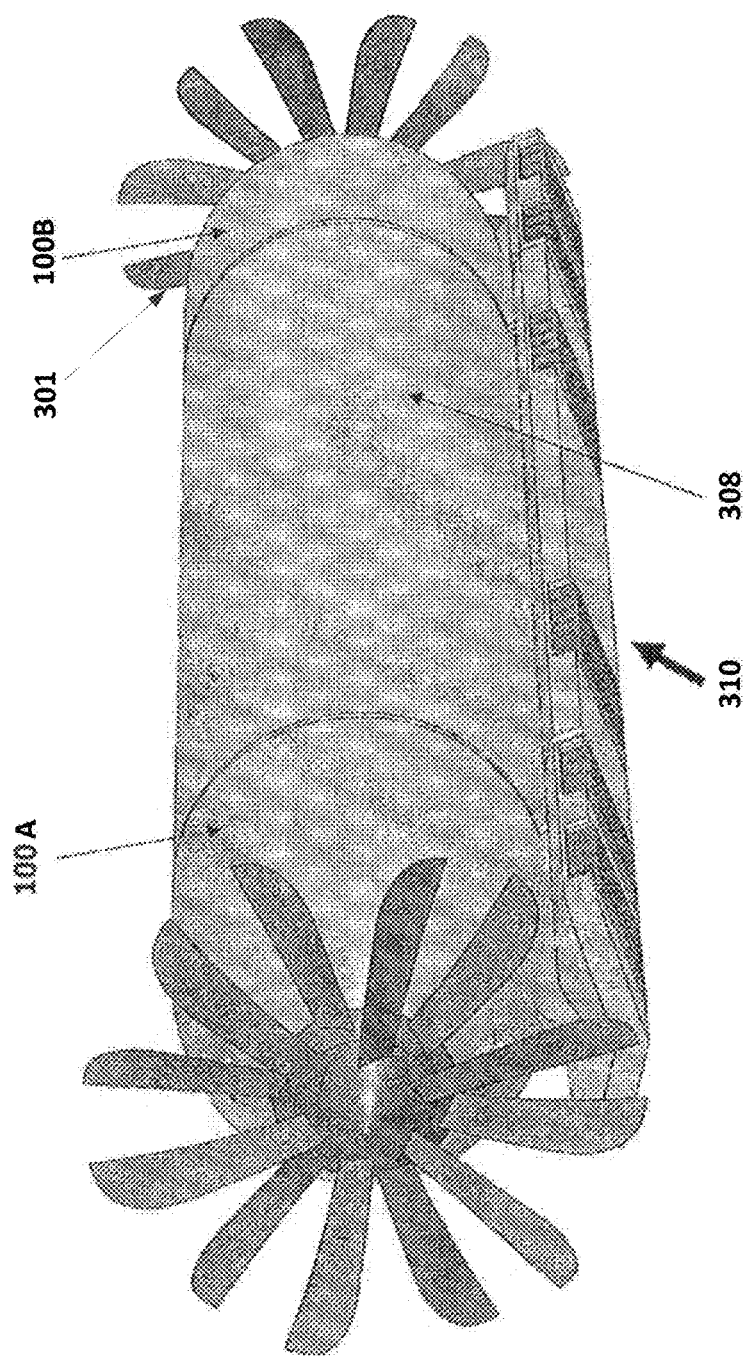
FIG. 3 is a front perspective view of a segmented vehicle including two vehicles connected with a car.

Alternatively, as shown in FIG. 2, the vehicle 100 may include a single propeller located only at one end of the vehicle. Although the vehicle 100 shown in FIG. 2 may be used as a singular vehicle, the vehicle 100 may also be part of a multi-articulated or segmented vehicle, similar to a train as shown in FIG. 3. The vehicle in FIG. 2 can be thought of as a "locomotive" in that it includes the propulsion system as well as associated motors and fuel systems, and additional unpowered cars may be coupled to the vehicle or be placed between two vehicles 100 for cargo or passenger transport. In other words, in the multi-articulated configuration, the vehicle 100 can serve as a "locomotive" for other cars, with one or more cars situated behind or in front of a "locomotive," or between two "locomotives" located at each end of the segmented vehicle. For instance, a first vehicle 100A may be connected to a car 308 and a second vehicle 100B. The car 308 has a levitation system 310, but it is not primarily designed to drive or propel other cars 308 or vehicles 100A, 100B. The car 308 may be configured to transport passengers, cargo, or both. The car 308 is constructed out of a similar material to the body 102 of the vehicle 100. The car 308 may have similar features to a passenger portion of an aircraft. For example, the car 308 may have seats, restrooms, a sink, a kitchen, and the like. The car 308 may connect to other cars as well as to the locomotive vehicle 100 via a coupler as discussed below. Although in FIG. 3 the car 308 is illustrated as connected to two vehicles 100A and 100B, only one vehicle 100 may be needed to pull a car 308, and the illustration is merely one embodiment. For instance, the vehicle 100 may pull car 308 by itself or the vehicle 100 may pull multiple cars 308 by itself. Furthermore, in other embodiments, there may be multiple cars 308 between vehicles 100A, 100B.

Referring again to FIG. 1, in one specific implementation, the outside surface of the vehicle body 102 supports one or more ailerons 111 that balance the vehicle when the vehicle is operated at a speed that is above a minimum speed ($V_{min}$) that may be determined from the atmosphere within which the vehicle is to operate and the shape of the vehicle. In one specific example, the vehicle may include a pair of ailerons, with one aileron supported on each side of the vehicle.

The wheel system 103, in one particular implementation, may include one or more wheels 107 longitudinally aligned along the bottom portion of the vehicle. The wheels are positioned and configured to interact with the support and guide structure provided within a conduit. In the specific example shown in FIG. 1, the vehicle may include two wheels.

Figure 5:
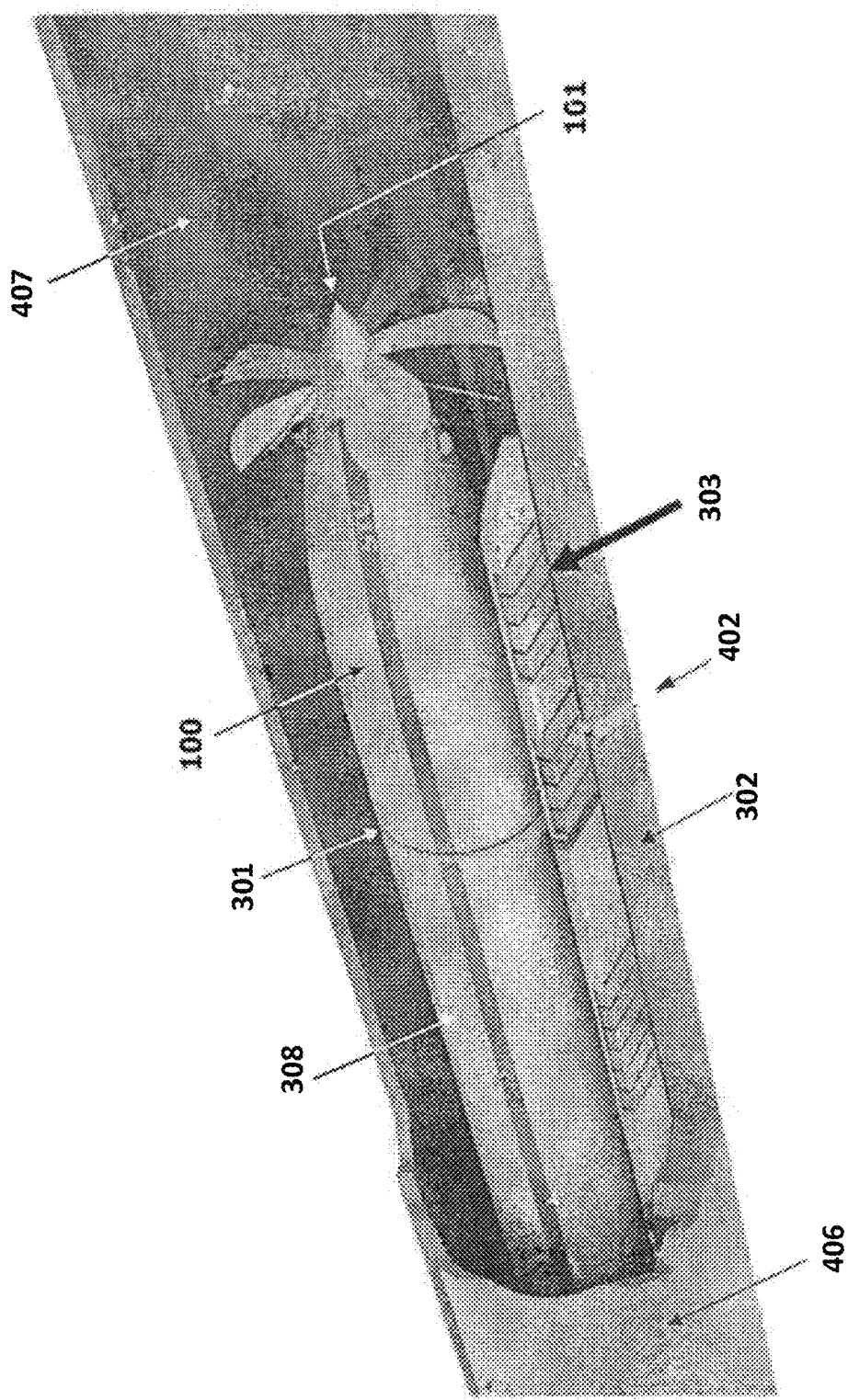
FIG. 5 is a perspective view of the tube vehicle of FIG. 3 within a tube.

Alternatively, as shown in FIGS. 2 and 5, the vehicle may include a levitation system 303 along the bottom portion of the vehicle instead of the wheel system 103. In one specific example the levitation system may include an aerostatic gas-bearing arrangement. Alternatively, the levitation system may be a magnetic levitation system. For the vehicle to operate in an enclosed structure, tube or generally a conduit, it needs to be appropriately dimensioned to fit in such a structure. In one specific example, when a vehicle operates in a circular tube with a diameter of approximately 8 meters, the vehicle may have a diameter of 2.8 meters and be 23 meters long. It is possible that the tube may have other shapes, besides circular, such as rectangular, a square, and may include one or more vehicle pathways.

As shown in FIGS. 1 and 2, the vehicle 100 includes some form of a propulsion system 104. In the embodiment discussed herein, the propulsion system 104 involves a propeller arrangement 105 that propels the vehicle 100 within the gas-filled conduit. The propeller arrangement 105 may have a single set of rotating blades, contra-rotating blades, axial-fan blades, or any other blade configuration suitable for propelling the vehicle 100. The propeller arrangement 105, in one implementation includes two sets of blades 109, 110 that rotate along a centerline 112 of the body 102 of the vehicle 100 with each set rotating in opposite directions with respect to the other. However, in other implementations, the propeller arrangement 105 may include a single set of blades that rotates in a single direction, may include fore and aft blades, sets of blade, etc. In some embodiments the propeller arrangement 105 may have a diameter of approximately 4 meters.

In general, the design of the propeller arrangement 105 may be optimized for the environment in which it will operate. In particular, the propeller arrangement may be designed in accordance with the size of the conduit and/or the atmosphere within the conduit, among other parameters. For example, the diameter of the propeller arrangement 105 may be a function of the size of the conduit and may be increased or decreased as the conduit diameter or size is increased or decreased. Furthermore, for a given operating atmosphere, rotational frequency, number of blades in the propeller arrangement, and/or diameter may be optimized to achieve satisfactory propeller static thrust, power loading, and efficiency.

In one particular example, propeller arrangement design may involve optimizing rotating frequency of the blades and the number of blades for a given propeller diameter. In general, propeller efficiency is defined as:

$$\eta = TV/P_s$$

where T is thrust, V is the velocity of the vehicle, and $P_s$ is the shaft input mechanical power. For a single propeller, the Rankine-Froude momentum theory of propulsion assumes that the operating gas is accelerated by an infinitely thin "actuator disc" of area S that provides energy to the gas but offers no resistance to gas as it passes through it. In unit time, the mass of gas passing through the actuator disc is:

$$m = \rho S V_o$$

where $\rho$ is density of the gas, and $V_o$ is the gas velocity at the immediate rear of the disc. The increase of momentum of the mass of fluid, and hence the thrust T on the disc is $$\Delta(mv) = T = \rho S V_o (V_s - V)$$

where V is the gas velocity far ahead of the disc, $V_s$ the gas velocity far behind the disc. Therefore, after several steps of derivation, the ideal efficiency ($\eta_i$) of the actuator disc is given by:

$$\eta = 2/(1 + V_s/V)$$

Similarly, the Rankine-Froude momentum theory when applied to contra-rotating tandem propellers assumes that the propeller be an ideal actuator disk with an infinite number of blades which exhibits no resistance to gas flow, transfers all mechanical energy to the gas, and experiences a uniform distribution of gas pressure and velocity over its surface. With the flow velocity $V_f$ through the front disk being defined as:

$$V_f = \frac{1}{2}(V + V_s)$$

where V is flow velocity far ahead of the disk (i.e., vehicle velocity, or initial inflow velocity, within the vehicle-fixed frame of reference) and $V_s$ is the fully-developed slipstream velocity far behind the disk, the mass flow through the front disk, in unit time increment, becomes:

$$m = \frac{1}{2}\rho S(V + V_s)$$

where $\rho$ is density of the gas and S is an area of the disk. Thus, thrust provided by the front disk of tandem pair is:

$$T_f = \rho S(V^2 + V_s^2)/2$$

and the power required by the front disk being given by:

$$P_f = (\rho S(V_s^2 - V^2)(V_s + V))/4$$

Because for the rear disk in the tandem configuration the initial inflow velocity V' may be greater than V, and its final slipstream velocity Vs' may be greater than Vs, the thrust and power for the rear disk differ from those for the front disk. Taking this into consideration and after several steps of derivation it can be shown that for a rear disk the thrust is given by:

$$T_r = \rho S(V_s^2 - V^2)(((1-\omega)V + \omega V_s)/V)^2/2$$

and power by:

$$P_r = \rho S(V_s^2 - V^2)(V_s + V)(((1-\omega)V + \omega V_s)/V)^3/4$$

where $\omega$ is the probability that a streamline in the slipstream from the front disk will intersect the rear disk defined by $\omega = A/A_t$ where A is the area of the rear actuator disk and $A_t$ is the cross-sectional area of the tube. Extending the Rankine-Froude propulsive efficiency to contra-rotating tandem propellers, thus, results in the propulsive efficiency for the tandem pair configuration being defined as:

$$\eta = V(T_f + T_r)/(P_f + P_r)$$

where V is vehicle velocity, $T_f$ and $T_r$ are the thrust provided by the front and rear disks, respectively, and $P_f$ and $P_r$ are the slipstream power required by the front and rear disks, respectively. Substitution of the power and thrust required by the front and rear disks, $P_f, P_r, T_f$ and $T_r$ gives:

$$\eta = (2V/(V_s+V))((V^3 + V[(1-\omega)V + \omega V_s]^2)/(V^3 + [(1-\omega)V + \omega V_s]^3))$$

as the propulsive efficiency for tandem disks in a tube. Additional details related to propeller design discussed herein may be found in "Hydrogen tube vehicle for supersonic transport: 4 Hydrogen propeller" by Arnold Miller published in the International Journal of Hydrogen Energy 37 (2012) 14603-14611, which is hereby incorporated by reference herein.

An important fact shown by these equations is that the propeller efficiency is independent of gas density. Thus, the efficiency of the propeller will not necessarily be changed by operating in hydrogen or any other atmosphere rather than in air. However, a different propeller diameter, rotational frequency, wider and/or more blades may be required to attain the same efficiency and thrust as a propeller operating in air.

Hence, for example, in case of a hydrogen atmosphere, a different (larger) propeller diameter, higher rotational frequency and/or more blades may be required to attain the same efficiency and thrust as a propeller operating in air. One specific hydrogen propeller design may employ 14 contra-rotating blades, 4.11 m diameter, and rotational frequency of 40.4 $s^{-1}$ at translational velocity of 970 m/s. The same is true for water propellers compared to air propellers: waterborne ship propellers are of similar efficiency but are smaller and slower-turning than comparable-power airplane propellers.

Additionally, from consideration of the kinetic-energy imparted to the slipstream, which preferably is minimized, the larger the diameter of propeller arrangement 105, the greater the potential propeller efficiency. However, as the diameter increases for a given rotational frequency (speed), the propeller tips will eventually enter the transonic region, and the considerations discussed above regarding dynamic instability and high power associated with the transonic region will apply to the propeller blades. Moreover, because the propeller traces out a helix as the vehicle advances, a vector component of rotational velocity should be added to vehicle translational velocity, and hence the blade-tip velocity exceeds the vehicle velocity. It is for this reason that propeller tip speed limits the speed of a propeller-driven vehicle, and a higher propeller diameter may require a lower rotational frequency.

Although the propulsion system may include a propeller arrangement 105, other forms of propulsion may be used in place of the propeller arrangement 105. For instance, the vehicle 100 may be powered by a motor, engine, and the like. If the vehicle 100 uses magnetic levitation, then the vehicle 100 may alternatively be propelled by a linear synchronous or linear induction motor. The stator of such a linear AC motor may be either on the vehicle 100 or on the guideway 302 (see FIG. 7); the linear equivalent of the rotor of a rotating AC induction or synchronous motor will be placed on the element opposite the stator. For example, if the stator is placed on the vehicle 100, then the linear-equivalent of the rotor will be placed on the guideway 302.

Figure 4:
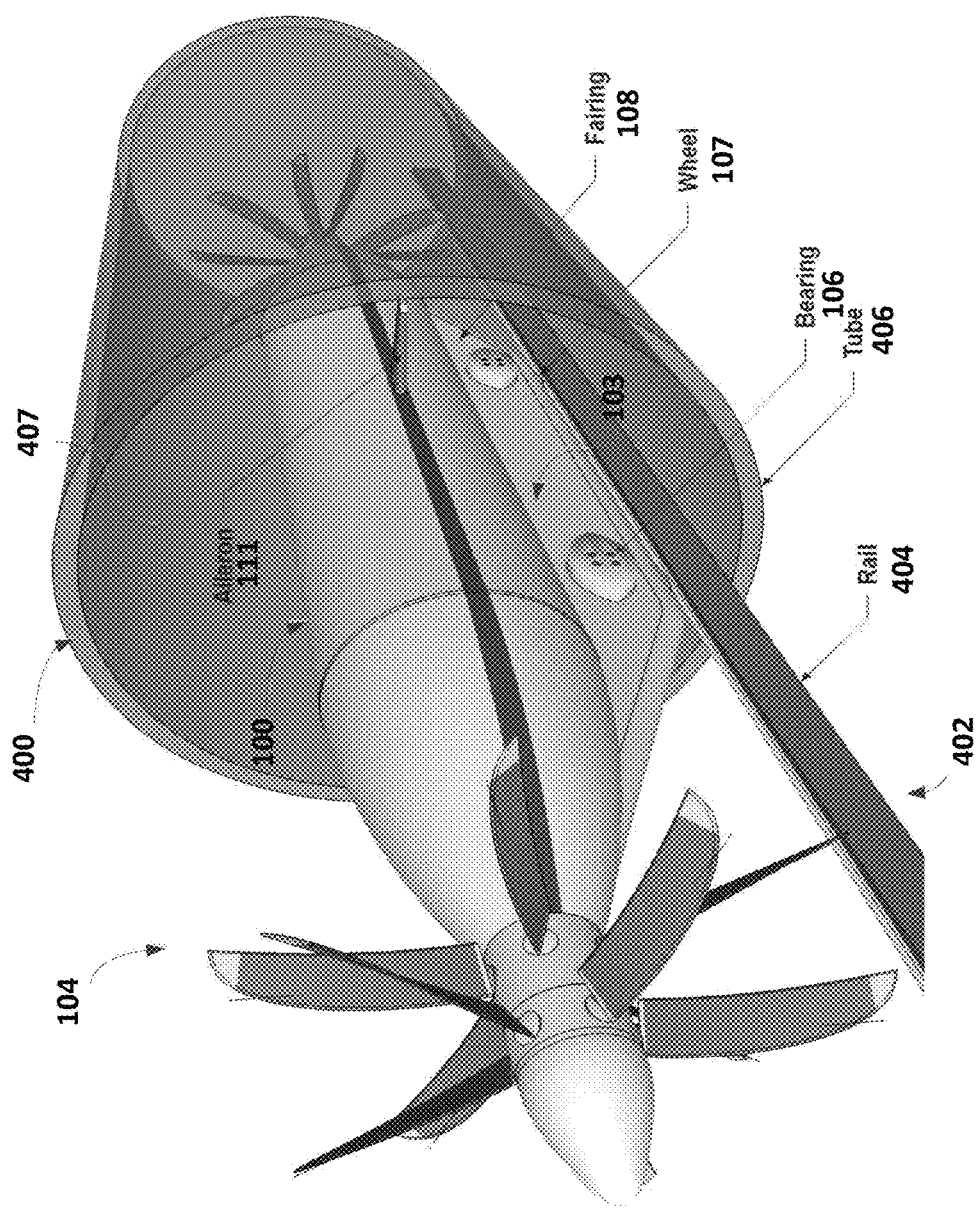
FIG. 4 is a perspective view of the tube vehicle of FIG. 1 within a tube.

FIG. 4 illustrates a prospective view of the vehicle 100 shown in FIG. 1 within a conduit 400. In the particular example shown, the conduit may comprise a tube 406 with a circular cross-sectional area. The vehicle 100 may travel through the tube 406 along a vehicle support and guide structure 402 located along the bottom of the tube 406. In the illustrated example, the support and guide structure may be a single rail 404 that is constructed from steel or any other suitable material. The rail 404 may be integral to the tube but may also be a separate structure that may be attached to the tube 406 by welding, fasteners, or other methods of attachment.

According to another implementation shown in FIGS. 2 and 5, when the vehicle 100 includes a levitation system 303 instead of the wheel system, the vehicle 100, in effect, flies within the tube 406. The vehicle 100 does not, however, have conventional wings. Instead, the vehicle 100 is elevated by way of the levitation system 303, which in one particular implementation is an aerostatic gas-bearing arrangement. The tube 406, as discussed herein, may include or otherwise define a guideway 302, or "vee-way" that matches the shape of the aerostatic bearings or other levitation system 303. The term "vee-way" derives from the terminology of machine tools (c.f., the "ways" or "vee-ways" of a lathe), and in this disclosure, the shape of the "way" is not necessarily in the shape of a "V" but could have other shapes such as a semicircle (or "U") or a rectangle. Similar to the rail 404 discussed above, the guideway 302 is not necessarily integral to the tube but may be a separate structure that may be attached to the tube 406 by welding, fasteners, or other methods of attachment. When the levitation system 303 includes an aerostatic gas-bearing arrangement, the aerostatic gas-bearing arrangement forces gas, or other fluids, through small orifices against a surface of the guideway 302, such as a vee-way, and thereby creates a small gap between the bearings and the vee-way to levitate the vehicle 100 within the tube 406. This arrangement in effect allows the vehicle to "fly" within the tube.

In yet another implementation, the vehicle 100 may travel through the tube 406 while supported by magnetic levitation, with appropriate magnetic system components included on the vehicle as well as the guideway 302. The tube 406 will have an appropriate guideway, generally analogous to the above-described vee-way for aerostatic gas-bearing levitation, and the vehicle 100 levitates above the guideway on a magnetic field rather than a fluid film. In these embodiments, the guideway includes magnetic material and the vehicle 100 has magnetic materials installed on the bottom of the vehicle 100, for instance, where the levitation system 303 is located. The guideway 302 may, for example, include tracks that have wires, solenoids, conducting materials, magnets, or may otherwise produce a magnetic field in order to produce levitation and/or propulsion of the vehicle 100.

Figure 6:
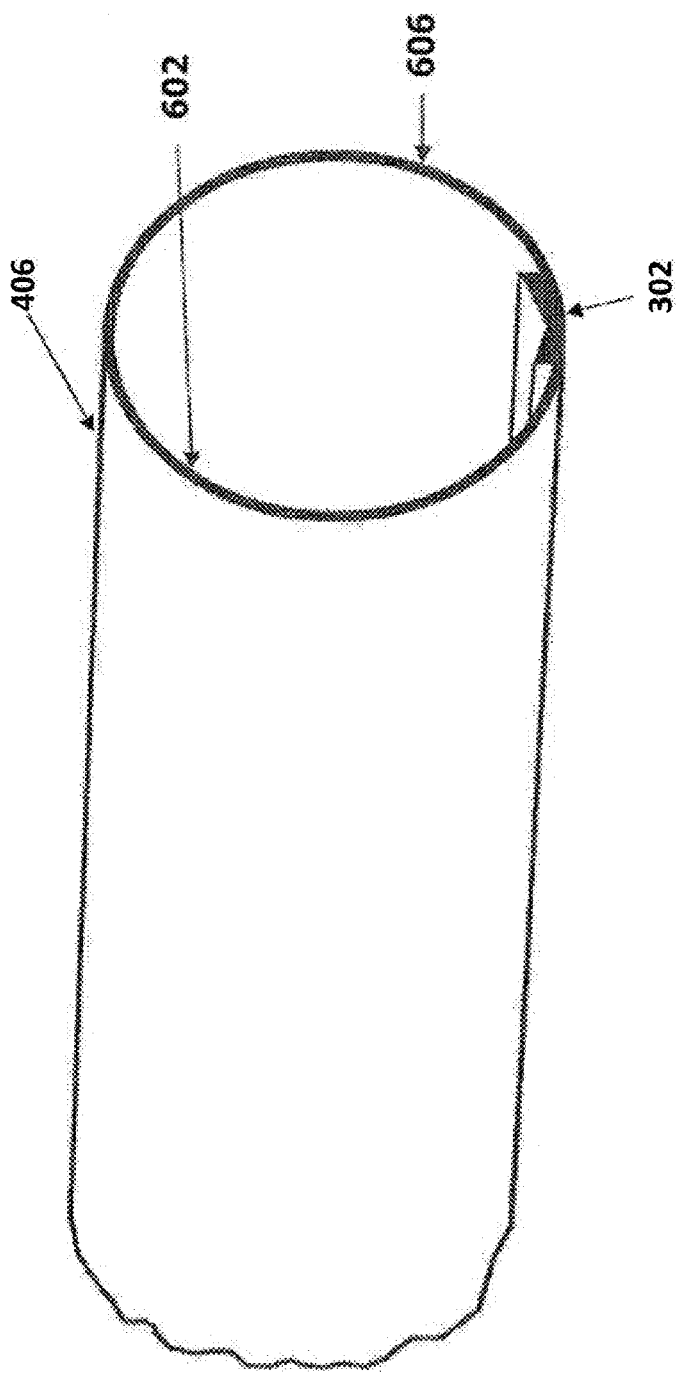
FIG. 6 is an isometric view of a portion of the tube with a guideway for supporting the tube vehicle.

FIG. 6 illustrates an isometric view of a portion of the tube 406 with a guideway 302. The tube 406 is generally cylindrical, including an inner diameter 602 and an outer diameter 606. In the example shown, the guideway 302 is a V-shaped guideway provided along a bottom portion of the tube. The guideway, as shown also in FIG. 5, is not necessarily integral to the tube but may be the equivalent to a V-shaped (or otherwise-shaped) rail or track running along the bottom of tube 406. The inner diameter 602 may be any suitable dimension to provide a conduit for various possible vehicle 100 diameters. In one particular embodiment, the inner diameter 602 may be approximately 5 meters. This diameter (5 meters) is able to accommodate an embodiment of the vehicle 100 having a 2.69 meter fuselage diameter and a propeller diameter of approximately 4 meters. This inner diameter 602 allows the vehicle 100 to fit inside the tube 406 while maintaining a gap between the wall of the inner diameter 602 and the vehicle 100 and its propellers 109, 110. This configuration allows the vehicle 100 to levitate above the bottom of the tube 406 and for hydrogen or any other gas to pass between the consist or trainset and the inner surface of tube 406 when the vehicle 100 is at speed. The outer diameter 606 forms the outside of the tube 406 and may be any size larger than the inner diameter. Additionally, as the tube 406 may be located either above ground, underground, or under water, the outer diameter 606 may be in contact with the surrounding elements, whether those elements be air, dirt, rocks, or water. Therefore, in some embodiments, the outer diameter 606 may include additional layers of insulation or protective materials to prevent wear and tear of the tube 406 due to outside elements. These additional layers may be concrete, plastic, composite materials, ceramics, metals, or any combination of similar materials.

The guideway 302 or any other similar support and guide structure may be used to support a track or other guidance system for the vehicle 100. In some embodiments, the guideway or any other similar support and guide structure may be located at the bottom of the tube 406, in other embodiments the guideway 302 or any similar support and guide structure may be located on the sides or top of the tube 406. In some embodiments, the guideway or any other similar support and guide structure may be used to support a rail system and may provide a track or tracks to support and guide the vehicle 100. The guideway 302 may be shaped in any manner, however in some embodiments the guideway 302 may be shaped as the letter "V" or as the letter "U".

Figure 7:
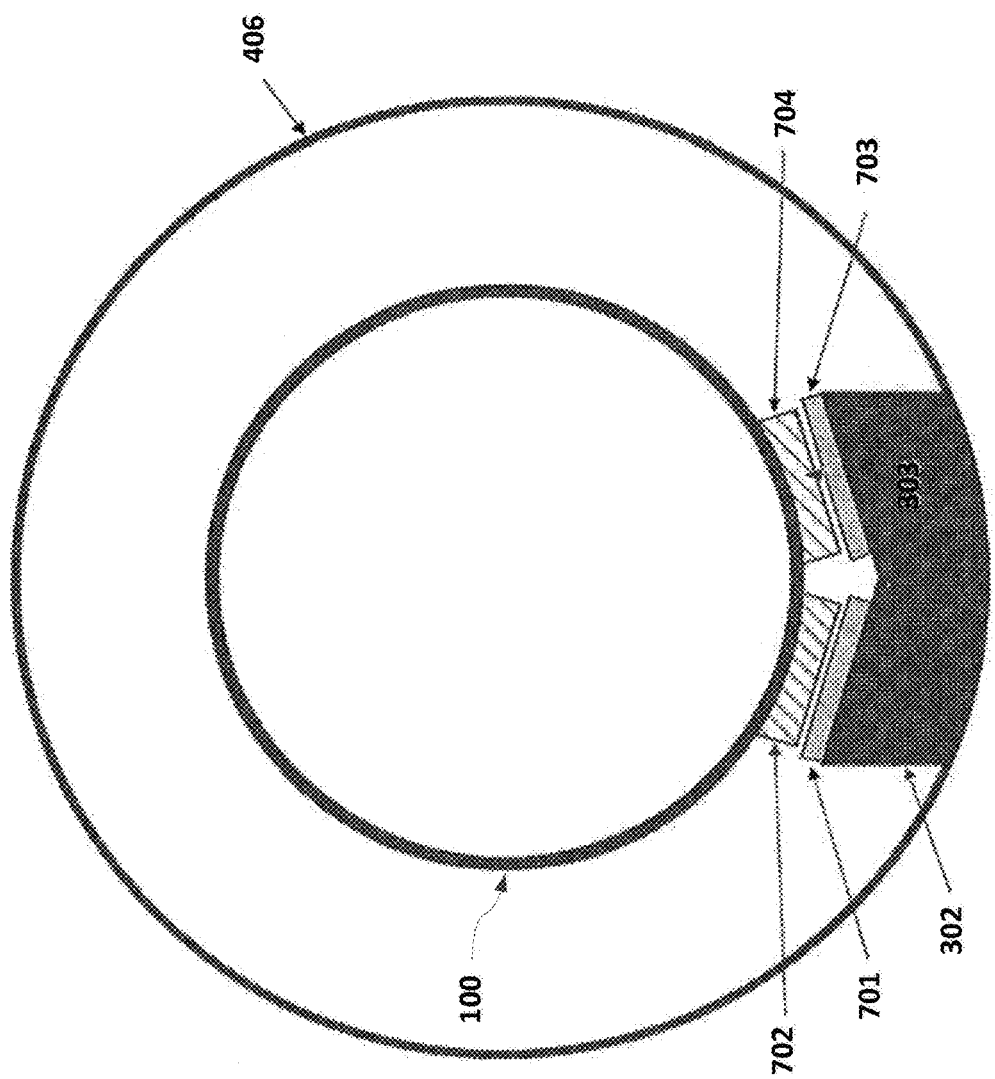
FIG. 7 is a schematic showing a magnetic-levitation apparatus for the vehicle.

FIG. 7 shows a schematic of magnetic levitation of the vehicle within the tube 406. Conforming to the shape of the vee-way, which may be in other shapes than a "V," as discussed above, are continuous metal sheets 701, 703, shown in cross-section in FIG. 7, running the length of tube 406. The metal should be of high electrical conductivity, and aluminum is an appropriate (but not limiting) material. Magnets 702, 704 replace the segments of the gas bearings in the vehicle that includes an aerostatic gas bearings arrangement. Several kinds of magnets may be used, for example, permanent magnets, superconducting magnets, AC electromagnets, or DC electromagnets. Embodiments of these are described as follows. When magnets 702, 704 are permanent or superconducting magnets, the relative velocity of the vehicle over the conducting sheets 701, 703 induce electrical currents and hence magnetic fields in the sheets. The induced magnetic fields in sheets 701, 703 are of the same-polarity (or "like-polarity") to the magnets on the vehicle (e.g., N on the bottom of levitation system 303 and also N on the top of sheet 701, 703), and the resulting N-N or S-S repulsion levitates the vehicle. The faster the relative velocity of vehicle 100 and sheets 701, 703, the stronger the induced field and the greater the potential height of the levitation gap between magnets 702, 704 and metal sheets 701, 703. When the vehicle is stopped there can be no induction and the levitation gap is zero. Hence, embodiments employing permanent or superconducting magnets employ "landing wheels" or some other mechanism to support the vehicle as it approaches and attains zero speed. Magnetic levitation may be used by itself or in combination with gas-bearing levitation.

The embodiment employing AC electromagnets is similar to the aerostatic gas-bearing embodiment. Alternating current in the solenoids of the AC electromagnets induces alternating same-polarity magnetic fields in metal sheets 701, 703. The same-polarity (N-N or S-S) of the electromagnet fields and induced fields produces levitation of vehicle 100. Like the aerostatic gas bearings discussed above, the AC magnetic levitation allows the vehicle to hover because the magnetic fields induced in the conductive sheets 701, 703 are due to the alternating current in the solenoids of electromagnets 702, 704 rather than relative motion of the vehicle. The AC-electromagnets 702, 704 may use feedback control of AC-solenoid current to control the gap height between magnets 702, 704 and the conductive sheets 701, 703 and hence the height of the vehicle above the sheets.

There is a type of DC magnetic levitation that can also provide hovering. In such an embodiment, the vehicle could be suspended below a ferromagnetic rail and an appropriate gap between the rail and DC magnets on the vehicle 100 would be provided through feedback control of the solenoid DC current. While this embodiment could require a very different design of the guideway—namely, a ferromagnetic rail rather than aluminum sheets on a vee-way—this is also a viable embodiment for magnetic levitation of vehicle 100.

The vee-way, with attached, conforming metal sheets or alternatively a ferromagnetic rail, then guides the vehicle 100 through the tube 406. The magnetic levitation apparatus conforms generally to the shape of the vee-way or ferromagnetic rail so that the vee-way or rail can guide the vehicle 100 through tube 406.

Figure 8:
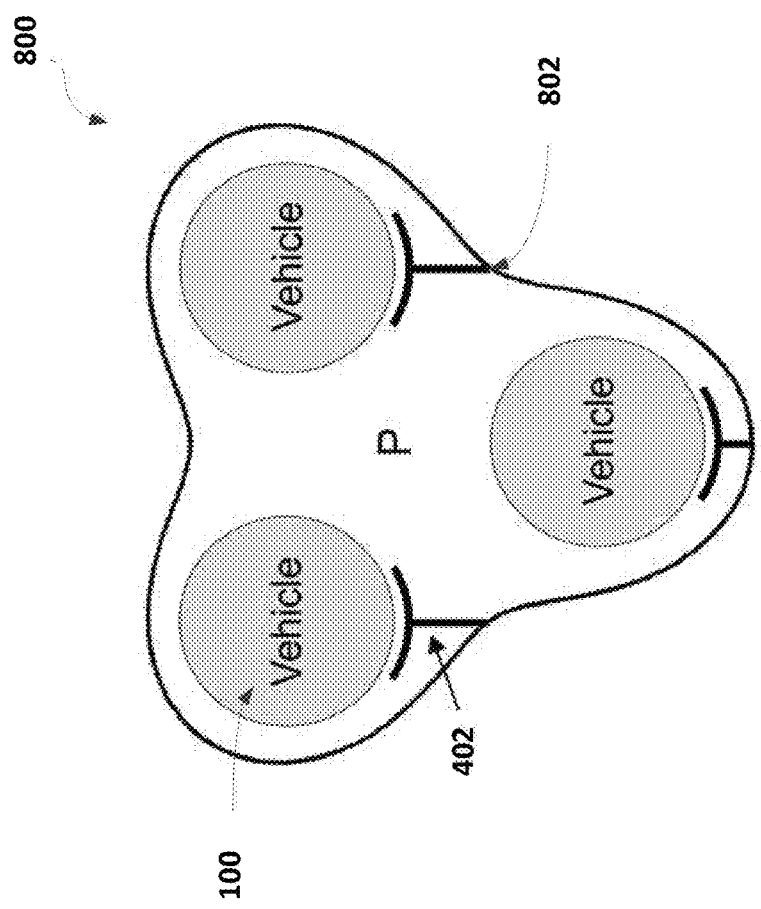
FIG. 8 is a schematic of one example of a tube with a fluted tube configuration.

Although, as discussed above, the conduit may be configured as a tube with a circular cross-section, alternatively the conduit may have a "waisted circle" configuration with a cross-section of a fluted or grooved tube as shown in FIG. 8. The fluted tube 800, which is a single tube with grooves or waists 802 along its length, could offer a number of benefits. First, increasing or maximizing the cross-sectional area of the tube relative to the vehicle may help to reduce aerodynamic drag, with the shared central part of the fluted tube acting as a plenum for vehicular flows. Second, when used in a system that allows either bidirectional or parallel transit, the fluted tube configuration may help minimize infrastructure costs. Additionally, as shown in FIG. 8, the "waisted circle" cross-section, by partially wrapping the tube around each vehicle provides structural stiffness to the tube. The "waisted circle" configuration also simplifies placement of a support and guide structure 402, as well as mitigates inference flow between passing vehicles.

One method of forming a fluted tube configuration may involve joining two or more separate, circular-section tubes, along their length to form a single fluted tube with grooves or waists along its length. In the specific example shown in FIG. 8, the fluted tube may be formed by conjoining three tubes such that the fluted tube includes three waists Although, the fluted tube configuration shown is formed from joining three tubes, a fluted tube formed from more or fewer tubes is also possible. A fluted tube may include a cross-section of a transformation of a circle such that N lobes, wherein N is a positive integer, are formed as N waists in a circle. The N waists correspond to a local minima in a curve's distance from a mathematical pole, and such locations are N-fold rotationally symmetric about the pole. The equation of such waisted circle, and thus, the cross-section of the fluted tube, is a polar equation $r=a+b \cos^2 ct$, wherein r is the distance of a point on the curve from the pole, t is the angular measure of the point in the polar coordinate system, c is an integral multiple of ½, and a and b are real parameters. When b=0, the cross-section of the fluted tube reduces to a circle. A more detailed discussion of the theoretical basis for the fluted tube design may be found in the "Fluted Tubes and Waisted Circles" paper by Arnold Miller published in the Int. J. of Mathematical Sciences and Applications, Vol. 1, No. 3, September 2011, which is hereby incorporated by reference herein.

Regardless of the tube configuration, the tube is built to the appropriate dimensions such that the vehicle 100 (or vehicles in case the tube is designed to support a bidirectional transit) can fit completely inside the tube. The tube may be constructed similarly to a pipeline for natural gas, oil, or water. For instance, the tube may be constructed of concrete, metal or other suitable materials. The tube may also include various types of seals to prevent the gas 407 filling the tube from escaping the tube. The seals may be any type of conventional material used to prevent air/gas from escaping an enclosed area. For instance, sealing may be provided by elastomers, concrete layers, rigid panels, or the like. The tube may inherently have sufficient gas-tight properties (e.g., a welded metal tube) so as to not require additional/separate seals. In some embodiments, the tube may be sealed in order to create a consistent environment for the vehicle 100 to travel, as well as to prevent impurities from entering the tube. Furthermore, in these embodiments, the tube may also contain air locks or other sealed entryways that allow the tube and vehicle 100 to be accessed from different locations.

In addition, the tube may also include a purification system to remove impurities, such as water that inadvertently slips through the vehicle water-collection system when, for example, hydrogen is used as the tube atmosphere or air that escapes around the air-lock seals, as well as any other unwanted materials, from the atmosphere 407 within the tube. In case of a hydrogen atmosphere, the purification system may utilize conventional purification hardware, such as pressure-swing-absorption, hydrogen palladium filters, or hydrogen catalytic combustors, through which the tube hydrogen may slowly pass. Analogous purification systems may be used for any of the other gases disclosed below.

The operating atmosphere inside the tube is selected to achieve aerodynamic tunneling that has the potential of enabling high-efficiency, quiet, supersonic transport. In particular, the atmosphere is selected to increase the speed of sound so that, although it is not necessary for the vehicle to travel at supersonic speed, its speed at a given Mach number will correspond to a higher absolute speed ($ms^{-1}$). The selected atmosphere will also have a lower gas density and/or viscosity so that drag is reduced. In other words, the ideal properties of such a gas are that the absolute speed be higher and density be lower than that of air at a given Mach number and pressure: The speed of sound in a gas increases as the density decreases, and the drag decreases as the density and viscosity decrease. Also, the potential operating atmosphere may be able to serve as a fuel for the propulsion fuel cells for vehicle 100 operating inside of the conduit. One method of determining the potential operating atmosphere for use inside the conduit may involve determining aerodynamic (tunneling) performance of the atmosphere and energy density of the tube vehicle with the product of the two parameters determining the rank of atmospheric merit. Alternatively, the potential operating atmosphere may be determined based on gas efficacy ($\Gamma$), with higher efficacy indicating higher speed and/or reduced drag. In particular, the higher the efficacy, the more the gas increases the Mach 1 speed or reduces drag. Based on the criteria of speed and drag, gas efficacy can be defined as:

$$\Gamma = c/D$$

where c is speed of sound ($m\ s^{-1}$) in the gas and D is drag (N) on an ideal flat plate used as an aerodynamic test body in the tube atmosphere. An important fact to note from this equation is that the efficacy $\Gamma$ increases as the first power of absolute speed at Mach 1, and varies inversely as the first power of skin-friction drag for laminar flow over the plate. With the speed of sound for the ideal gas given by:

$$c = (\gamma p/\rho)^{1/2}$$

where $\gamma$ is the ratio of specific heats, p is constant tube pressure, and $\rho$ is tube gas density. Friction drag on either face of a rectangular flat plate of infinitesimal-thickness is given by:

$$D = \frac{1}{2}(C\rho V^2 bL)$$

where C is the friction drag coefficient, V is speed of the plate (or of the flow), b is width of the plate, and L is the length parallel to the flow, the gas efficacy $\Gamma$ after several steps of derivation, can be shown to be equal to $$\Gamma = 2/(1.328(\gamma p)^{1/4}\rho^{1/4}\mu^{1/2})$$

where $\mu$ is gas viscosity. Substituting thermo-physical properties of various gases into the above equation provides ranking of the gases for their potential use as a conduit atmosphere based on the gas efficacy parameter. Examples of potential conduit atmosphere gases ranked using gas efficacy parameter are shown in Table 1. Although gases listed in the table can be used individually, use of a mixture of any of the listed gases as the tube atmosphere is also contemplated. Additional information on the methods for determining potential gases for tube atmosphere can be found in the "Aerodynamic Tunneling" article by Arnold Miller submitted to and accepted for presentation at the World Hydrogen Technologies Conference, to be held in Shanghai, China, from 25-28 Sep. 2013, as well as "Hydrogen tube vehicle for supersonic transport: 3. Atmospheric merit" article by Arnold Miller published in International Journal of Hydrogen Energy 37 (2012) 14598-14602, which are hereby incorporated by reference herein.

TABLE 1

Gas parameters and efficacy $\Gamma$

| Gas[a] | Mol. Wt. g/mol | $c^b$ $m\ s^{-1}$ | $\gamma^c$ | $\rho^d$ $kg\ m^{-3}$ | $\mu^e \times 10^6$ Pa s | $\Gamma$ $s\ kg^{-1}$ |
|---|---|---|---|---|---|---|
| $H_2$ | 2 | 1310 | 1.384 | 0.0824 | 8.90 | 48.7 |
| Air (11 km)[i] | 29 | 295 | 1.4 | 0.364 | 14.14 | 38.7 |
| $NH_3$ | 17 | 415 | $1.310^f$ | $0.73^g$ | $9.80^h$ | 27.3 |
| $CH_4$ | 16 | 450 | 1.305 | 0.6556 | 11.10 | 26.3 |
| He | 4 | 965 | 1.664 | 0.1636 | 19.90 | 26.2 |
| $C_2H_2$ | 26 | 329 | $1.260^g$ | $1.11^g$ | $9.54^h$ | 25.1 |
| $C_2H_6$ | 30 | 312 | 1.193 | 1.2291 | 9.40 | 25.0 |
| $C_3H_8$ | 44 | 258 | 1.134 | 1.8025 | 8.30 | 24.5 |
| $C_2H_4$ | 28 | 331 | $1.242^g$ | 1.1465 | 10.30 | 24.1 |
| HCl | 36 | 296 | $1.41^f$ | $1.56^g$ | $13.20^h$ | 19.1 |
| $SO_2$ | 64 | 213 | 1.282 | $2.77^g$ | $11.58^h$ | 18.07 |
| CO | 28 | 338 | $1.402^g$ | 1.1449 | 17.80 | 17.8 |
| $N_2$ | 28 | 353 | 1.403 | 1.1449 | 17.90 | 17.7 |
| $CO_2$ | 44 | 259 | 1.293 | 1.7989 | 14.90 | 17.7 |
| $N_2O$ | 44 | 263 | $1.27^f$ | $1.872^g$ | 15.00 | 17.6 |
| Air (sea level)[i] | 29 | 340 | 1.4 | 1.2256 | 17.83 | 17.5 |
| $Cl_2$ | 71 | 206 | $1.34^f$ | $3.04^g$ | $12.45^h$ | 16.8 |
| NO | 30 | 325 | $1.386^f$ | $1.27^g$ | 19.20 | 16.7 |
| $O_2$ | 32 | 330 | 1.393 | 1.3080 | 20.70 | 16.0 |
| $CCl_2F_2$ | 121 | 140 | $1.138^j$ | $5.11^g$ | $11.68^h$ | 15.9 |
| $F_2$ | 38 | 332 | $1.352^f$ | $1.59^g$ | 24.60 | 14.0 |
| $SF_6$ | 146 | 133 | $1.09^k$ | $6.27^g$ | $14.20^h$ | 13.8 |
| Ar | 40 | 323 | 1.664 | 1.6329 | 22.70 | 13.8 |
| Ne | 20 | 435 | $1.650^f$ | $0.853^g$ | 32.10 | 13.7 |

[a]Ranked by decreasing order of $\Gamma$. Temperature T = 298-300 K unless otherwise noted. Pressure for all gases = 101.3 kPa, except for air at 11 000 m, which is at 22.6 kPa [9].
[b]Speed of sound from [10-12].
[c]Specific-heat ratios from [13] except NO, $N_2O$, $NH_3$, HCl from [14] and $Cl_2$ from [15].
[d]Densities from [13] except $H_2$, He, $CH_4$, CO, $N_2$, $C_2H_4$, $C_2H_6$, $O_2$, Ar, $CO_2$, $C_3H_8$ from [10], p. 8-135.
[e]Viscosities from [10], p. 8-135, except $N_2O$ from [10] p. 6-190, and also $NH_3$, $C_2H_2$, HCl, $SO_2$, $Cl_2$, $CCl_2F_2$, $SF_6$, from [13] and $F_2$ from [16].
[f]T = 293-294 K.
[g]T = 273 K.
[h]T = 288-290 K.
[i]Physical properties of the standard atmosphere [9, 17] at altitude z indicated. T = 288 K at z = 0; T = 217 at z = 11 km. Viscosity of air at 11 000 m also reported as 14.2 Pa s [18].
[j]T = 303 K.
[k]Calculated from R = $C_p - C_v$, where R is the gas constant and $C_p$ and $C_v$ are heat capacities at constant pressure and volume, respectively. $C_p$ = 0.097 kJ mol−1 K−1 at 100 kPa and 294 K [13].

In one specific implementation, the conduit atmosphere may contain hydrogen that was determined as having both highest overall merit as well as gas efficacy. In the particular embodiment discussed herein, this hydrogen gas environment provides the vehicle 100 with its fuel, and the tube hydrogen consumed by the vehicle is replaced from a source of hydrogen outside the tube. Hydrogen 407 is used within conduit 406 as the vehicle 100 can travel within the hydrogen atmosphere at supersonic speed with respect to air outside the tube while remaining subsonic inside the tube; the low density and viscosity of hydrogen results in lower drag for the vehicle relative to the outside air; and the high thermal conductivity of hydrogen facilitates heat rejection from the vehicle compared to heat rejection to atmospheric air and especially to reduced-pressure air.

The hydrogen 407 within the tube 406 may be maintained at a pressure slightly above atmospheric pressure. For example, the pressure within the tube may be maintained at about 0.05 bar above ambient atmospheric pressure. The relatively higher pressure inside of the tube assures that hydrogen 407 would leak out of the tube through any inadvertent breach (e.g., crack, pinhole leak in a weld, or similar breach) in the tube, rather than have the outside air atmosphere and other elements leak into the tube, thereby maintaining a safe working environment for vehicle 100. An objective of not allowing air to leak into the tube is that by keeping the concentration of hydrogen at or above 75% (by volume), the hydrogen 407 will be held above the upper flammability limit of hydrogen and the hydrogen 407 will be too rich to burn. This method of safety also applies to any of the other flammable gases (see Table 1 above) that may be used as tube gases because of increased gas efficacy, although the upper flammability limit will vary for each gas.

One embodiment of an atmosphere alternative to hydrogen is methane, or natural gas, which is substantially methane. The density of methane at a given pressure is about half the density of air at the same pressure, and methane can be used as a fuel for fuel cells. As for hydrogen above, the pressure of the methane within the tube may be maintained slightly above air pressure outside the tube, and thereby any inadvertent leakage through tube would be leakage of methane to the outside of the tube rather than leakage of air into the tube. Analogous to the substantially hydrogen-filled tube, an objective of not allowing air to leak into the substantially methane-filled tube is that by keeping the concentration of methane at or above about 17% (by volume), the methane will be held above the upper flammability limit of methane and the methane within the tube will be too rich to burn. The methane breathed by the vehicle 100 may be converted to hydrogen onboard the vehicle 100 by a steam reformer, or similar chemical processor, and the hydrogen then supplied to the fuel cell to provide propulsion power; alternatively, some fuel cells, for example, solid-oxide fuel cells, may operate directly on methane. In this embodiment using methane as the atmosphere within the tube, the products of the chemical processes onboard the vehicle 100 are substantially both water and carbon dioxide, and in one embodiment, the carbon dioxide may be chemically trapped onboard the vehicle 100 and thereby not released into the tube 406. The technique may use any method of trapping carbon dioxide, for example, converting it to a liquid or solid or chemically trapping it as a product such as a carbonate. In the case of trapping the carbon dioxide as a carbonate, the carbon dioxide may be readily reacted with a strong base such as calcium hydroxide to give the solid calcium carbonate. In this embodiment, the trapped carbon dioxide may be stored onboard the vehicle 100 until the end of a run, at which time it would be removed from the vehicle 100 to make room for more trapped carbon dioxide on a subsequent run of the vehicle 100.

Another possible gas for use within the tube is helium. Having a density twice that of hydrogen but about seven times less than air and having a viscosity about the same as air, it would provide a lower operating gas density than air for the vehicle 100 and would thereby give a higher sonic speed and lower drag than air outside the tube. However, it would not be as good in this regard as hydrogen, and because helium is an inert gas, it would not be useable as a fuel for the onboard propulsion fuel cells of the vehicle 100.

While the use of a single high-efficacy gas for the tube atmosphere is desirable in order to achieve higher speed and/or reduced drag, in some instances these gases may provide relatively low thrust for a propeller and therefore possibly result in low acceleration of the vehicle. The same consideration applies to braking of the vehicle by the propeller. This is due to the fact that the propeller thrust is a function of the first power of gas density as shown and discussed above. Low acceleration could limit the system to long-range applications (thereby allowing sufficient distance to accelerate to cruise speed), or limit the weight of the vehicle, or limit the achievable speed of the vehicle. One possible method for overcoming this potential limitation of the high-efficacy gases is to utilize gases with different densities in different parts of the tube so as to create "density stages."

Figure 9:
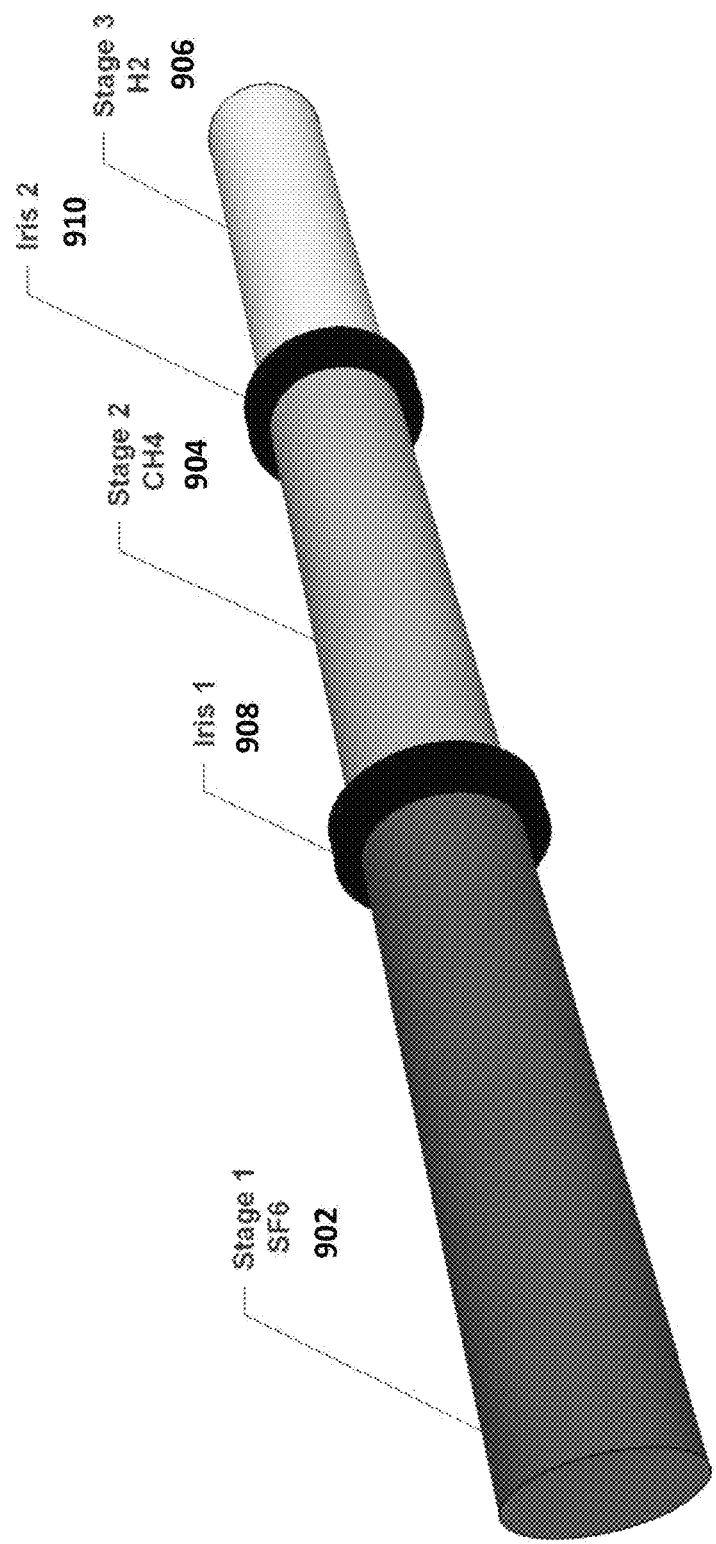
FIG. 9 is a schematic diagram of one example of "density stages" within a tube.

The schematic in FIG. 9 and a numerical example in the accompanying Table 2 provide an example implementation of density stages. It should be noted that the gases used in this description and the shape of the conduit are presented as one example of the method of density stages and are not intended to be limiting in any way. Thus, for example, the density stages could be also used in a fluted tube configuration and/or the stages could be used in different parts of the tube to assist with accelerating as well as braking of the vehicle. In the specific example shown, the tube is divided into three sections. The three sections of gray tubes shown (not to scale) may represent a portion of the tube or conduit within which the vehicle accelerates. The left-most section 902 is termed "Stage 1" (shown as the darkest gray color); the central section 904 is termed "Stage 2" (intermediate gray color), and the right-most section 906 is termed "Stage 3" (lightest gray color). Each section or stage contains a different gas: Stage 1 contains the dense gas sulfur hexafluoride (denoted as SF6 in the figure); stage 2 contains the less-dense gas methane (denoted CH4); and stage 3 contains the low-density gas hydrogen (denoted H2). Other gases, such as for example, carbon tetrafluoride ($CF_4$), 1,1,1,2-tetrafluoroethane ($CF_3CFH_2$), halocarbon 23, halocarbon 116, halocarbon ocarbon 218, halocarbon 32, halocarbon 125 halocarbon 134A, halocarbon 21, halocarbon 22, and other halocarbons and similar dense gases may also be used as conduit (or tube) gases in different stages because of their high density. Also, mixtures of any of the gases in Table 1, or mixtures of any of the dense gases just mentioned, or mixtures of any combination of gases from Table 1 and the dense gases just mentioned, may be used as the conduit atmosphere, in any stage or in the entirety of the tube. The achievable speed of the vehicle, at a given Mach number, increases as it traverses from Stage 1 to later stages because the speed of sound in a gas is a decreasing function of density. The stages are separated by movable doors 908, 910 that substantially act as partitions between the stages and, when closed, prevent mixing of the gases. In one implementation, the doors are mechanical irises (shown as Iris 1 and Iris 2 in the figure), but sliding doors, or a door, barrier, partition with any mechanism that allows it to open and close quickly can be used, and "iris" is intended to be descriptive of the function and not limiting. For braking, at the other end of the tube, the sequence of densities would be in the opposite order, going from less dense to more dense.

As an example of the operation of density stages, consider that the tube vehicle commences its transit from the left-most part of the three-stage tube shown in FIG. 9. Because the density of sulfur hexafluoride is 76-times denser than hydrogen, the propeller thrust in Stage 1 can be 76 times what the thrust would be if the tube contained only hydrogen. Since acceleration for a given mass of vehicle is proportional to thrust, the acceleration in Stage 1 can be 76 times what the acceleration would be in an un-staged tube with only hydrogen, for example. The system is arranged so that the vehicle approaches the end of Stage 1 and hence Iris 1 at the same time that it approaches its limiting speed in Stage 1 (i.e. a given Mach number). At this point, Iris 1 opens, allowing the vehicle to enter Stage 2, and then closes behind the vehicle. The vehicle continues its transit in Stage 2 until it approaches its limiting speed in Stage 2. Once the vehicle reaches the end of Stage 2, Iris 2 opens and then closes after the vehicle passes, allowing the vehicle to enter Stage 3 and thereby continue its transit within the tube.

In another implementation, Iris 1 and Iris 2 are each comprised of a pair of irises. The first pair of irises may straddle the location of Iris 1 in FIG. 9, and the second pair of irises may straddle the location of Iris 2. By having a relatively short section of tube between a first iris and a second iris of each of the pair of irises, each pair of irises acts as a gas-lock and reduces mixing of the gases in the various stages as the vehicle passes between the stages. As the vehicle approaches the first iris of the first pair of irises, the first iris opens and closes and thereby captures the vehicle in the relatively short section of tube between the first and the second iris of the first pair of irises. The second iris of the first pair then opens and closes, allowing the vehicle to enter Stage 2. A similar operation occurs for the pair of irises that straddle the location of Iris 2 in the figure. A pair of irises thus prevents direct flow of gas between any two stages as the vehicle passes between stages.

Table 2 set forth below gives a numerical example of the benefits of multiple stages. In this example, which is not intended to be restricting in any manner, assume that the limiting speed in each stage is Mach 0.74, and the acceleration in the hydrogen stage is 2.4 m/s$^2$ which may be constant. The accelerations in Stages 1 and 2 are also constant and are proportional to their respective gas densities (see Table 2) compared to hydrogen; thus, the acceleration in Stage 1 is (6.27/0.0824) 2.4 m/s$^2$=182.6 m/s$^2$, and the acceleration in Stage 2 is (0.6556/0.0824) 2.4 m/s$^2$=19.1 m/s$^2$. With these parameters, the time and distance to traverse each stage, as well as the total time and distance (the sums of the times and distances in the separate stages), are calculated from the standard equations in physics for acceleration of masses and are given in Table 2.

If the tube included only a single gas, such as, for example hydrogen, the time required to reach 969 m would be 404 s, and the distance required to reach this speed would be 195,778 m. Thus, using the three stages in the example results in substantial reductions in the vehicle's total time and distance: Time is reduced from 404 s to 278 s, and distance is reduced from 195,778 m to 85,843 m. Reduced time would result in faster service for passengers or cargo; in some implementations, reduced distance to reach cruise speed allows the vehicle more length of its tube for cruise speed and braking, as well as reduces the mass and cost of the dense gases of the acceleration stages. The greater the number of stages in the method of density stages, the larger the reduction of time and distance.

TABLE 2

Density stages

| Stage | Gas | Limiting speed m/s | Density kg/m$^3$ | Time to traverse stage s | Distance to reach end of stage m |
|---|---|---|---|---|---|
| 1 | SF$_6$ | 98 | 6.27 | 0.5 s | 27 |
| 2 | CH$_4$ | 333 | 0.6556 | 12.3 | 1441 |
| 3 | H$_2$ | 969 | 0.0824 | 265.2 | 84,376 |
| | Total: | | | 278 s | 85,843 m |

Figure 10:
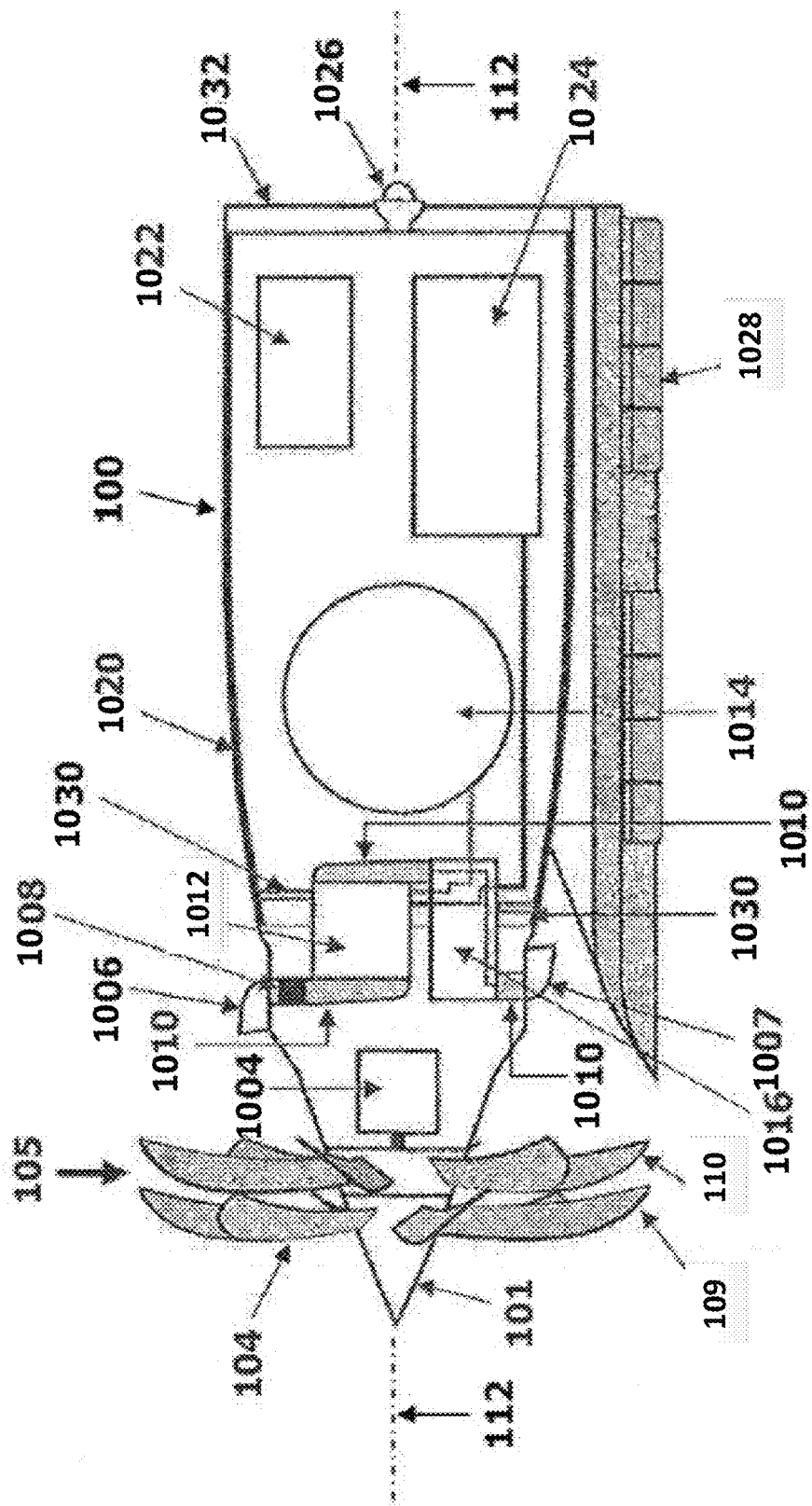
FIG. 10 is a block diagram illustrating the functional components of the vehicle of FIG. 2.

The discussion will now turn to some of the functional components of the vehicle 100. FIG. 10 is a block diagram illustrating the functional components of the vehicle 100 shown in FIG. 2. Discussing first the front of the vehicle 100, the propeller arrangement 105 provides vehicle propulsion. The propeller arrangement 105 includes a first set of blades 109 and a second set of blades 110, and these blades 109, 110 are configured to rotate about a common axis 112 defined generally along the longitudinal centerline of the vehicle 100. Each set of blades is coupled with a common propulsion motor 1004, although distinct propulsion motors for each set of blades 109 or 110 are possible. The propulsion motor(s) 1004 may be either DC or AC electric motors, hydraulic motors, or the like. The first and second sets of blades 109, 110 each can include a number of blades that is optimized for the atmosphere in which they operate. In the example shown, the first and second sets of blades each include six blades concentrically and evenly spaced about the common axis. The motor 1004 drives the first set of blades 109 in one direction, e.g., clockwise, and the second set of blades 110 in the opposite direction, e.g., counter-clockwise. In this arrangement, the contra-rotating blades help to reduce energy losses due to the unproductive rotation of the slipstream, and this arrangement is more efficient than propellers having a single set of non-contra-rotating blades. Additionally, the contra-rotating blade sets 109, 110 may produce minimal to zero net torque on the vehicle 100. This feature helps to prevent inadvertent contact between the guideway 302 and the levitation system 303 when used, should torque be introduced into the system, especially at vehicle 100 startup. In other embodiments, the propeller arrangement 105 may have a single set of blades. In this embodiment, the propeller arrangement 105 may be a single rotating propeller; the advantage of this embodiment is that the propeller arrangement 105 produces less noise than the contra-rotating double blade-set propellers, has a simpler drive mechanism than contra-rotating propellers, and is less expensive.

Another possible propeller arrangement may include contra-rotating, tandem propellers, with one contra-rotating propeller assembly located at each end of the vehicle. The propeller arrangement according to this embodiment, similar to the contra-rotating propeller discussed above, helps to reduce energy losses and is more efficient than propellers having a single set of non-contra-rotating blades. Additionally, the contra-rotating, tandem propeller helps the vehicle achieve higher speeds as compared to the vehicle equipped with either a single set of non-contra-rotating propellers or a single contra-rotating propeller located at only one end of the vehicle.

The blades of each of the first and second blade set 109, 110 are connected to the body of the vehicle 100 at the tip region 101 of the body 102. The blade arrangements 109, 110 may be provided with more or fewer blades, and in some instances more blades (e.g., 7 instead of the 6 shown in FIG. 2) may facilitate an increase in propeller efficiency and thrust or result in less noise. Similarly, in some embodiments, the wider the blades 109, 110 and the more uniform the thrust distribution on the blades 109, 110, the higher the efficiency of the propeller arrangement 105. Similarly, the blades 109, 110 may be shaped in a swept-back configuration as in a supersonic wing, and have an angular shape with a sharp leading edge, which together allow a higher vehicle speed at which shock waves from the propeller become limiting.

In addition to driving or propelling the vehicle 100, the propeller blades 109, 110 may be used to brake and stop the vehicle 100 or reverse the direction of the vehicle 100. When used for braking of the vehicle, pitch of the blades may be reversed so that the propellers are running as turbines whose electric power is dissipated in a resistor or used to regenerate rechargeable batteries. That is, braking of the vehicle 100 may be accomplished by increasing the pitch of the propeller blades 109, 110 beyond the feathered position. Alternatively, the vehicle could use a "gas brake" wherein one or more plate-like structures are extended to increase the aerodynamic drag on the vehicle, or the vehicle could use an eddy-current brake wherein eddy currents are induced into a metal structure along the rail, or into the rail itself, by one or more electromagnets carried on the vehicle.

Reversal of the vehicle may involve rotation of the blades 109, 110 by 180° around their radial axes, followed by reversal of rotational direction of the propellers 109, 110. Once the vehicle 100 is slowed (braked) by changing the propeller pitch, as described above, the method of reversing vehicle 100 may include rotation of the blades 109, 110 by 180° around their radial axes, followed by reversal of rotational direction of the propellers. This feature allows the vehicle 100 to levitate within the tube 406 and still be able to stop without relying on friction brakes, which can produce significant amounts of heat and suffer wear. However, friction brakes, or an equivalent mechanical form of braking, may be used to hold the vehicle 100 in place on the guideway once it has been braked and stopped by the propellers 109, 110. For instance, the vehicle 100 may use friction brakes, magnets, or the like placed on the levitation system 303 or on the bottom of the vehicle 100, to stop the vehicle 100. Similarly, the vehicle 100 may use a second propeller located at the rear of the vehicle 100, which propeller set is normally configured to provide propulsion supplementing the front propulsion system but may separately be used for braking. In any case, the vehicle 100 may be stopped or put in reverse in any manner.

The motor 1004 drives the propeller arrangement 105. The motor 1004 is powered by a fuel-cell stack 1012. It is possible to use other power sources or supplement the fuel-cell stack 1012 power output. However, in the implementation discussed herein, the fuel-cell stack 1012 synergistically "breathes" the hydrogen 407 (or other gas) within the tube 406 as its fuel source. The motor 1004 may be any device capable of using energy or electricity to drive the propeller 104. For example, the motor can be an alternating-current (AC) motor, a direct current (DC) motor, a hydraulic motor, and the like. In one embodiment, the motor 1004 is an AC induction motor.

When the vehicle operates in a tube filled with hydrogen, to collect hydrogen gas 407 (or other gas) from the tube 406 for use in the fuel cells of the vehicle 100, an intake scoop 1006 is provided on the vehicle 100 near the propeller arrangement 105. The intake scoop 1006 collects hydrogen 407 from the tube 406 and directs it into the fuel-cell stack 1012 in a flow-through manner. To exhaust excess hydrogen from the vehicle 100, an exhaust scoop 1007 is provided, in one embodiment, on the diametrically opposite side of the vehicle 100. The diametric disposition of scoops 1006, 1007 is illustrative and not intended to be limiting, and any angle formed between scoops 1006, 1007 and the vehicle centerline 112 may be used. The exhaust scoop 1007 releases excess hydrogen 407 not consumed by the fuel-cell stack 1012 from the vehicle 100 to the tube 406. Each scoop may be rotated by 180° when the vehicle 100 reverses direction of travel. That is, in order to maintain hydrogen flow in a fixed direction through the fuel-cell stacks, if scoop 1006 is the intake scoop in one direction, it may be rotated by 180° when the vehicle 100 reverses direction, and thereby it will continue to be the intake scoop. It will continue to be the intake scoop because the direction of the hydrogen airstream relative to the vehicle 100 has changed by 180°.

The intake scoop 1006 and the exhaust scoop 1007 are oriented in opposite directions. The intake scoop 1006 faces the front of the advancing vehicle and hence hydrogen 407 is rammed into the scoop and delivered to the fuel-cell stacks. The exhaust scoop 1007 faces toward the rear of the advancing vehicle 100 and hence the relative motion of the vehicle 100 and hydrogen 407 tend to suck the hydrogen flowing through the stacks 1012 into tube 406. The effects of ramming and sucking work together to distribute hydrogen through the fuel-cell system in a passive manner. The intake scoop 1006 and the exhaust scoop 1007 may be constructed out of suitable material for withstanding the high gas pressure of high speeds. The intake scoop 1006 and the exhaust scoop 1007 may be any shape capable of receiving and dispersing hydrogen 407 to and from the tube 406. In some embodiments, the intake 1006 and the exhaust 1007 may be shaped as open rectangular vents. For the combined ramming and sucking effects to work in each direction of vehicle 100 travel, the intake 1006 and the exhaust 1007 are designed to rotate by 180° when the vehicle 100 changes direction from forward to reverse.

A fan 1008 assists the intake 1006 in pulling hydrogen 407 from the tube 406. For example, when the vehicle 100 is not moving or is moving slowly, the intake 1006 may not be able to passively breathe as much hydrogen 407 as is necessary to operate the fuel cells 1012. In these instances, the fan 1008 turns on and pulls hydrogen 407 through the intake 1006 using suction or other means. The fan 1008 is located in a duct system 1010 that channels hydrogen from the intake 1006 to the fuel-cell stack 1012. The fan 1008 may be an axial fan, a squirrel-cage fan, a pump, or the like. In some embodiments, the fan 1008 may only operate when the vehicle 100 is traveling at low speeds or is stopped. In other embodiments, the fan 1008 may operate at all vehicle 100 speeds, such that the hydrogen 407 intake flow through scoop 1006 is maximized or otherwise controlled.

The duct system 1010 transports gas 407 from the intake 1006 to the fuel cells 1012 and from the fuel cells 1012 to the exhaust 1007. The duct system 1010 may involve piping, tubing, or any suitable conduit that transports the hydrogen 407 from within the tube 406, to within the vehicle 100 and then directs the unused or excess hydrogen 407 back into the tube 406. However, the duct system 1010 may be omitted, for instance, the intake 1006 and exhaust 1007 may directly connect to the fuel cells 1012 and to the tube 406 environment, without the additional piping or tubing.

As discussed above with respect to the motor 1004, the fuel-cell stack 1012 supplies power to drive the motor 1004. A fuel cell may use hydrogen and oxygen to generate electricity. The fuel cells in stack 1012 receive hydrogen 407 from the tube 406 via the intake 1006 and receive oxygen from an oxidant storage container 1014 onboard the vehicle. In some embodiments the fuel cells 1012 are an acid-electrolyte proton-exchange membrane type, wherein liquid oxygen provides oxygen (the oxidant) to the fuel cells, and the fuel-cells' fuel, hydrogen (the reductant or reducer), is breathed from the tube 406. In these embodiments, hydrogen flows through the fuel-cell stacks, in the manner described above by the action of the scoops 1006, 1007, and oxygen is dead-ended. The fuel-cell stack 1012 produces electricity when hydrogen at the anode gives up electrons to an external circuit plus positively charged hydrogen ions that move through an electrolyte (not illustrated) within the fuel cells of stack 1012 and combine with the oxygen to produce water at the cathode. As the oxygen is dead-ended, water is produced at the cathode as a waste product of the electricity production of the fuel cells 1012. This embodiment allows the water produced by the fuel-cell stack 1012 to be stored onboard in a waste storage container 1024, versus being exhausted into the tube 406. Excess hydrogen gas that is not used in the energy conversion process is expelled back into the tube 406 via the exhaust scoop 1007. However, the fuel cells of stack 1012 may be any fuel-cell type that uses hydrogen and oxygen as fuel sources. More generally, the fuel cells may use any gaseous fuel that provides the atmosphere within tube 406, for example, methane. Examples of fuel-cell types are proton-exchange membrane fuel cells, alkaline fuel cells, phosphoric acid fuel cells, molten carbonate fuel cells, solid oxide fuel cells, and the like. There may be any number of fuel cells within stack 1012. For instance, to increase the power of the vehicle, more fuel cells may be added to stack 1012, or the size of the fuel-cell electrodes in stack 1012 may be increased, depending on the power requirements of the vehicle 100.

The oxidant storage tank 1014 holds the oxidant required to operate the fuel cells of stack 1012. The oxidant storage tank 1014 may be any type of storage device suitable for storage of a compressed gas, a cryogenic liquid, a chemical oxygen source such as hydrogen peroxide, or the like. In one embodiment, the fuel storage tank 1014 holds liquid oxygen in a vacuum-insulated storage tank; however, the oxidant storage tank 1014 may be used to hold oxygen gas, chemical precursors of oxygen, or other desired oxidant capable of reacting with hydrogen. The fuel cells 1012 combine oxidant from the oxidant storage tank 1014 with the hydrogen 407 collected from the tube 406 via the intake scoop 1006.

A water separator 1016 may separate water from cathodic oxygen and remove traces of water from the hydrogen exit stream through scoop 1007. For instance, in some embodiments, the separator 1016 separates water from cathodic oxygen and runs the separated water to storage tank 1024. The separator 1016 may also function to condense unwanted materials and thereby prevent them from entering the tube 1006. For instance, the separator 1016 may also remove traces of water from the hydrogen exiting the fuel-cell stack 1012. One embodiment of the separator is also used as an evaporator to convert liquid oxygen stored onboard to gaseous oxygen used by the fuel cells; the cold liquid oxygen on one side of a heat-exchange surface causes freezing of the impurities, for example, water, on the other side of the heat-exchange surface.

A set of coolant lines 1030 supply waste heat from the fuel cells and other components to the liquid-oxygen evaporator within separator 1016 and then expel the excess heat to the hydrogen 407 via a liquid-gas heat exchanger 1020. The source of waste heat is primarily from the fuel cells, the propulsion motor(s), and the power electronics.

A heat exchanger 1020 is connected to the coolant lines 1030 and may be used to reject excess heat from the fuel cells, the propulsion motor(s), and the power electronics to the hydrogen atmosphere in the tube 406. Because of the high thermal conductivity of hydrogen (seven times greater than air), the heat exchanger in one embodiment is simply a thin shell on the outside of the body 102. In contrast, liquid-air heat exchangers, for example, the radiator of an automobile, require a greater surface area than this embodiment because of the seven-fold lower thermal conductivity of air versus hydrogen.

The power electronics subsystem 1022 changes and controls the voltage of the DC output from the fuel cells 1012 to the voltage, DC or AC, as required by the propulsion motor 1004, vehicle communications systems, vehicle control systems, passenger-car HVAC and lighting systems, and all other electrical components on the vehicle 100.

Waste water produced from the reaction of hydrogen and oxygen within the fuel cells is directed towards a water storage container 1024. The water storage container 1024 is connected to the separator 1016. The waste storage container 1024 may be constructed out of any type of material suitable to store water, for instance, plastic, metal, or the like. Waste water storage, in one embodiment, is provided by a horizontally oriented cylinder and may have a volume of about 1500 liters. However, depending on the desired trip length of the vehicle 100, the size of the vehicle 100, the type of fuel cells used, etc., the waste storage container 1024 may be designed to hold more or less volume.

The levitation system 303 according to the embodiment shown in FIG. 2 utilizes aerostatic gas-bearings 1028 that may collectively be comprised of smaller bearing units such as segments, as described below. Hydrogen gas is pumped through porous gas bearings 1028 and the flow of hydrogen, or other gases such as methane or helium, between the bearing surface and the vee-way surface levitates the vehicle 100. Thus, the vehicle 100 levitates on a low-friction fluid film provided by gas-bearings 1028.

A coupler 1026 is used to connect multiple vehicles together, as well as connect the vehicle 100 to passenger or cargo cars. For instance, as illustrated in FIG. 3, the vehicle 100 may act as a locomotive and pull other cars. In the implementation shown herein, the locomotive tube vehicle is conically shaped with the propeller arrangement 105 located at a tip area 101 of the body 102, and the coupler 1026 is positioned at a planar area 1032 at the rear of the vehicle 100, opposite the tip 101. A car 308, as shown in FIG. 3, is cylindrical with a circumference matching that of the area of the locomotive adjacent to the planar area. The car 308 has generally planar front and rear areas to minimize the gap 301 between car 308 and locomotive 100 and thereby reduce aerodynamic drag. The gap 301 may furthermore be covered by a thin flexible seal to further reduce aerodynamic drag. In these embodiments, for a consist of two locomotives (one front and one rear) and one or more cars 308, the coupler 1026 attaches the locomotives 100 to one or more passenger cars 308, and passenger cars to each other, allowing the vehicle 100 to pull the cars 308. The consist (also referred to as a trainset) 100, 308 of FIG. 3, that is, the assembly of locomotives and train cars, is multi-articulated, and articulation allows swiveling of adjacent segments of the consist (or trainset) in three-dimensional space. Relative motion in three dimensions allows the trainset to conform to the vee-way as the vee-way twists in curves and bows at the top and bottom of hills. The vehicle 100 may be connected via the coupler 1026 to a number of different passenger cars and a second locomotive vehicle may be attached at the end of the passenger cars. The coupler 1026 in some embodiments may be a ball and socket coupling, but in other embodiments may be a hook and latch, buffers and chains, link and pin, and the like.

FIGS. 11A and 11B illustrate a side-view and a bottom view, respectively, of the vehicle 100, emphasizing the gas-bearing levitation system 1100, which includes the gas bearings 1028. The levitation system 1100 may include a front set of bearing segments 1102, 1103 and a back set of segments 1104, 1105. The segments are positioned longitudinally along the length of the body 102 of the vehicle 100. The segments may twist, tilt, or rotate, possibly under the control of servo mechanisms that sense the shape of the vee-way, so as to allow the gap between a segment and the vee-way to be controlled. The suspension system 1100 may also include a fairing 1106 that partially covers the segments 1102-1105 and thereby reduces the aerodynamic drag on the gas bearings 1028. The fairing 1106 is attached to the bottom of the vehicle 100, and has generally planar sides 1108 and a planar back portion 1109, but tapers to a beak-like point 1110 oriented to the front of the vehicle 100 (the direction of travel). Below the planar sides 1108, a surface of the fairing 1106 also defines a downwardly angled V-shaped area, which is contoured to match a V-shaped surface on the guideway 302. For example, the guideway 302 may be shaped as a vee-way, and the fairing 1106 may then be shaped as a "V", to conform to the shape of the vee-way. Aerostatic bearing segments 1103 and 1105 are separated on the face of the lower V-shaped portion of the fairing 1106, and the opposing segments 1102 and 1104 are supported on the opposing face of the V-shaped portion of the fairing 1106. The levitation system 1100 may additionally include a strut 1107. The strut 1107 supports the body 102 of the vehicle 100 above the levitation system 1100. The strut 1107 is disposed between the body 102 of the vehicle and the fairing 1106.

The segments 1102-1105 include four segments for each bearing surface, but any number of segments may be used. The segments 1102-1105 are included both on vehicles acting as locomotives, as well as passenger and cargo cars. Referring now to FIG. 11B, the suspension segments 1102-1105 may be grouped into sections, a first segment 1102, a second segment 1103, a third segment 1104 and a fourth segment 1105, not necessarily numbered in this description as they occur along the length of the vehicle 100. The bearing segments 1102-1105 may be aerostatic gas bearings or the magnets of the magnetic-levitation embodiment described below. In the aerostatic gas-bearing embodiment, the segments 1102-1105 have multiple holes or are made of a porous material. For example, the segments 1102-1105 may be constructed of porous graphite or of metal that may be sintered or contain holes, allowing the flow of fluid between the segment and the upper V-shaped surface of the vee-way. Fluid (gas or liquid) is pressurized and forced out of the holes of the segments 1102-1105, creating a low-friction fluid film between the bearing segments 1102-1105 and the top of the vee-way (guideway) 302, effectively levitating the vehicle 100 above the bottom portion of the tube 406 on a thin film of gas or liquid. If the suspension system 1100 has aerostatic gas bearings, the gas 407 used to suspend the vehicle 100 may be hydrogen. Likewise, if the gas 407 is an alternative gas, for example, methane or helium, this gas will likewise be the operating fluid of the aerostatic gas bearings. The hydrogen or other gas 407 may be provided to the gas-bearing levitation system 1100 by the intake 1006, and pressurized via a gas pump carried onboard vehicle 100 powered by the fuel cells. In this embodiment, the atmosphere of the tube 406 is not polluted by having materials other than the desired tube atmosphere enter the tube, as the gas 407 is taken from the tube 406 and then distributed back into the tube 406 as it creates a fluid film to levitate the vehicle 100. In other embodiments, hydrostatic (water) bearings may be used as the fluid in the levitation system 1100. In this embodiment, liquid is forced out through the segments 1102-1105 creating the suspension layer for the vehicle 100. The liquid water is then collected in a trough running down the center of the tube 406. If water is the levitating fluid, the hydrogen or other gas comprising the atmosphere 407 may be saturated with water vapor. In the case of magnetic levitation, the segments 1102-1105 represent permanent magnets, superconducting magnets, AC electromagnets, or the like.

Figure 12:
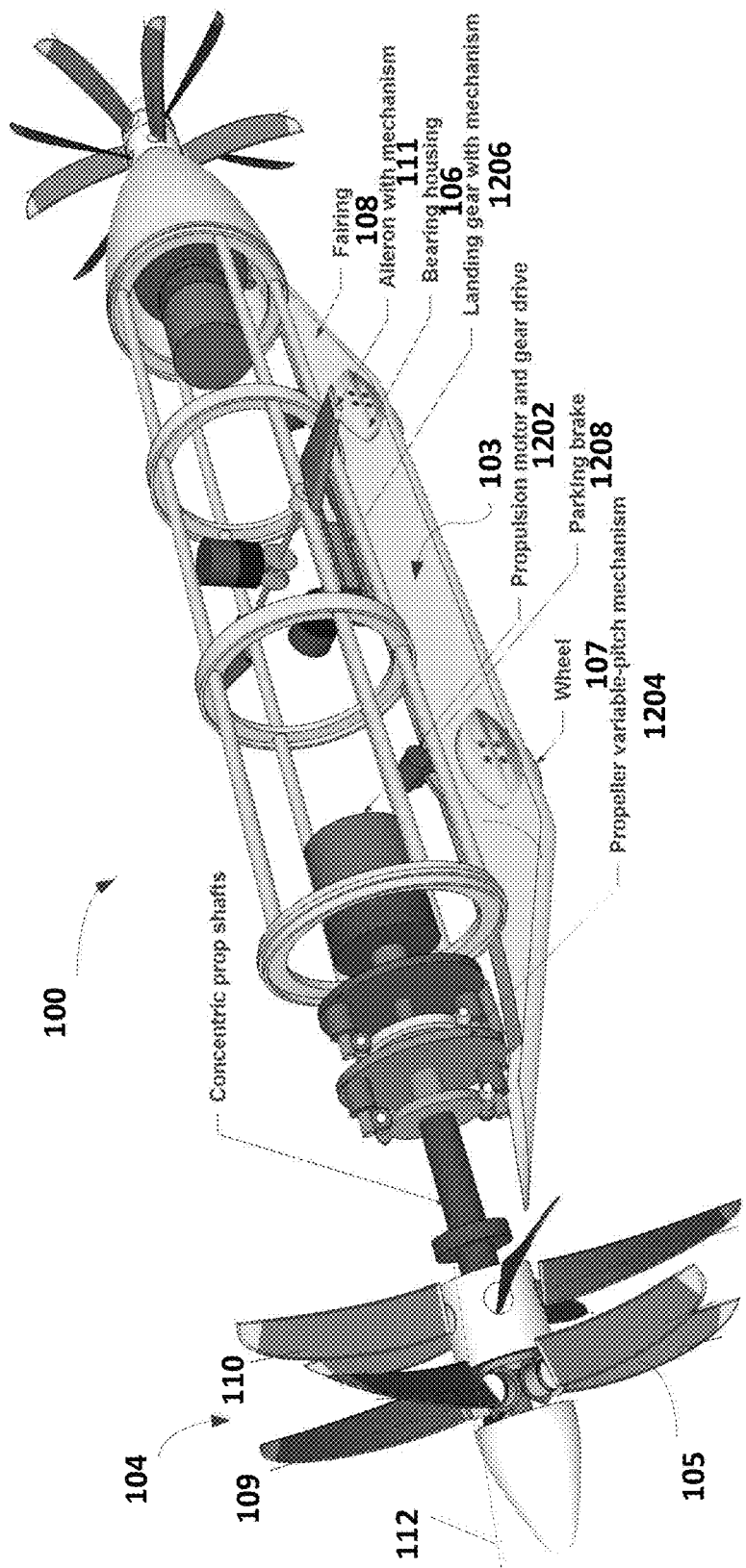
FIG. 12 is a perspective view of the inside of the tube vehicle of FIG. 1 illustrating some of the functional components of the vehicle.
Figure 13:
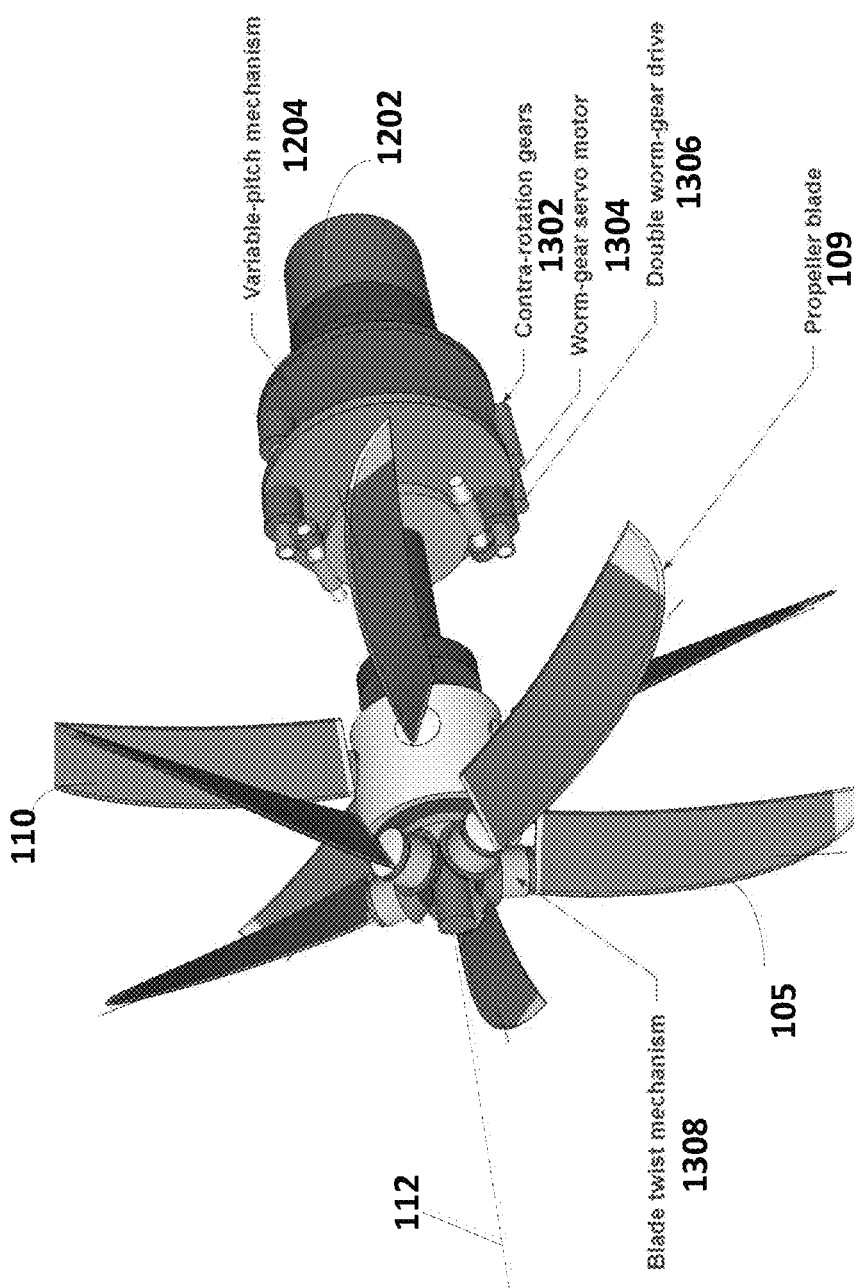
FIG. 13 is a perspective view of a propeller system according to some aspects of the disclosure.

FIG. 12 illustrates a perspective view of some of the functional components of the vehicle 100 shown in FIG. 1 according to some other aspects of the current disclosure. In the specific example shown in FIG. 12, the vehicle includes contra-rotating tandem propellers, with one contra-rotating propeller assembly located at each end of the vehicle. The propeller arrangement according to this embodiment, similar to the contra-rotating propeller discussed above, helps to reduce energy losses and is more efficient than propellers having a single set of non-contra-rotating blades. Additionally, the contra-rotating, tandem propeller helps the vehicle achieve higher speeds as compared to the vehicle equipped with either a single set of non-contra-rotating propellers or a single contra-rotating propeller located at only one end of the vehicle. As shown in the figure, each propeller arrangement 105 includes a first set of propeller blades 109 and a second set of propeller blades 110 that are configured to rotate about a common axis 112 defined generally along the longitudinal centerline of the vehicle 100. In the example shown, the first and second sets (or more than two sets) of blades include five blades each concentrically and evenly spaced about the common axis, although the number of blades provided in the first and second sets of blades can be optimized for the atmosphere in which they are to operate as discussed above, and the number of blades can be different in the two sets, e.g., six in the first set and five in the second set. Each set of blades is coupled with a common propulsion motor 1202 that drives each set of blades in opposing directions making the propeller function as a contra rotating propeller. Alternatively, each row of blades (e.g., five blades in vehicle 100) could have its own propulsion motor. The propeller arrangement is further coupled to a propeller variable pitch mechanism 1204 that provides control of the pitch of the blades. In one implementation, the variable-pitch mechanism is not housed within the propeller hub but in the vehicle body. As shown in more detail in FIG. 13, the variable pitch mechanism 1204 includes contra-rotation gears 1302, a worm-gear servo motor 1304 and a double worm-gear drive 1306 that together with a blade twist mechanism 1308 couple to each propeller blade function to control propeller pitch.

Figure 14:
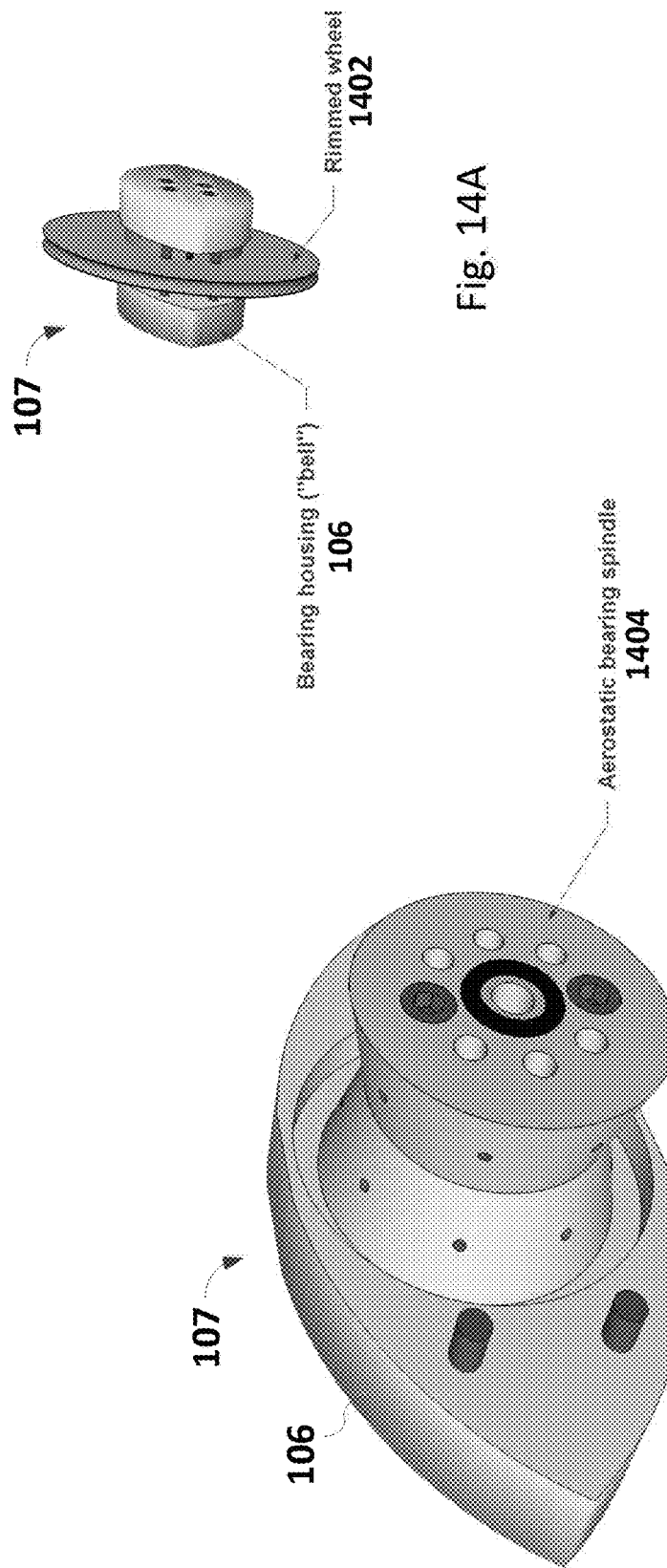
FIGS. 14A and 14B are perspective views of a wheel and bearing for the tube vehicle of FIG. 1 according to some aspects of the disclosure.

Referring still to FIG. 12, the vehicle 100 includes the wheel system 103 that may include one or more wheels 107 longitudinally aligned along the bottom portion of the vehicle. As shown in FIG. 14 the wheels 107 may be rimmed wheels 1402 with an aerostatic bearing spindle 1404 and a bearing housing 106. For the example vehicle having dimensions discussed above, the wheels may have a diameter of 0.08 meter. In order to protect the wheels and to reduce the aerodynamic drag, the wheel system may also include a fairing 108 that partially covers the wheels. The fairing 108 is attached to the bottom of the vehicle 100, and has generally planar sides, but tapers to a beak-like aerodynamic point oriented to the front, bottom, and rear of the vehicle 100.

Figure 15:
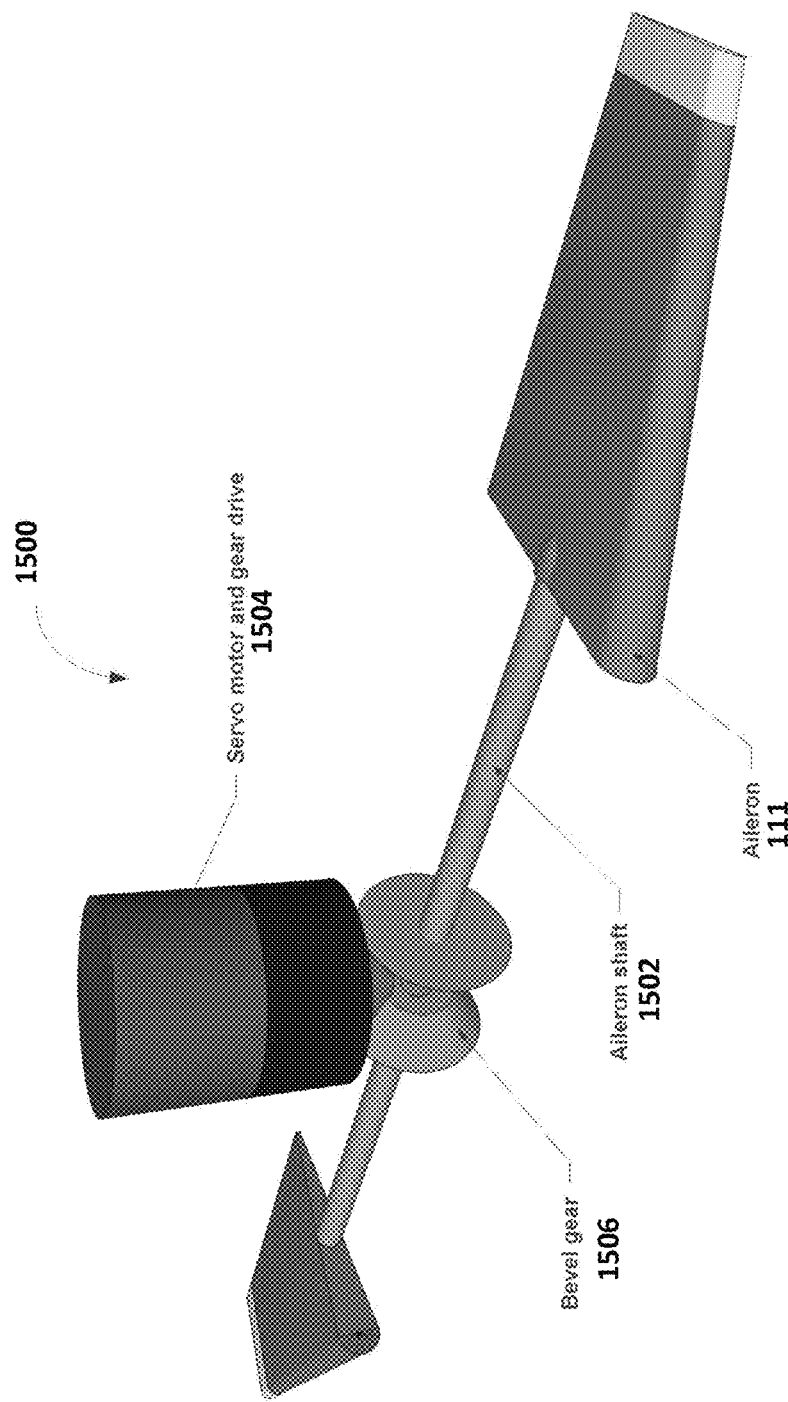
FIG. 15 is a perspective view of a landing gear assembly for the tube vehicle of FIG. 1 according to some aspects of the disclosure.

The vehicle 100 may also include ailerons 111 toward the middle of the vehicle that function to balance the vehicle when the vehicle is operated above a certain minimum speed ($V_{min}$). As shown in more detail in FIG. 15, the ailerons 111 are part of an aileron assembly 1500 that includes a pair of ailerons located at each end of an aileron shaft 1502. The ailerons, driven by a servo motor and gear drive 1504 coupled to a bevel gear 1506, twist in opposite directions. The aileron assembly may also include a sensor or a set of sensors that measure an angle of inclination of the vehicle. Information from the sensor(s) can be used to control the ailerons through a feedback mechanism, and thereby keep the vehicle close to upright.

Figure 16:
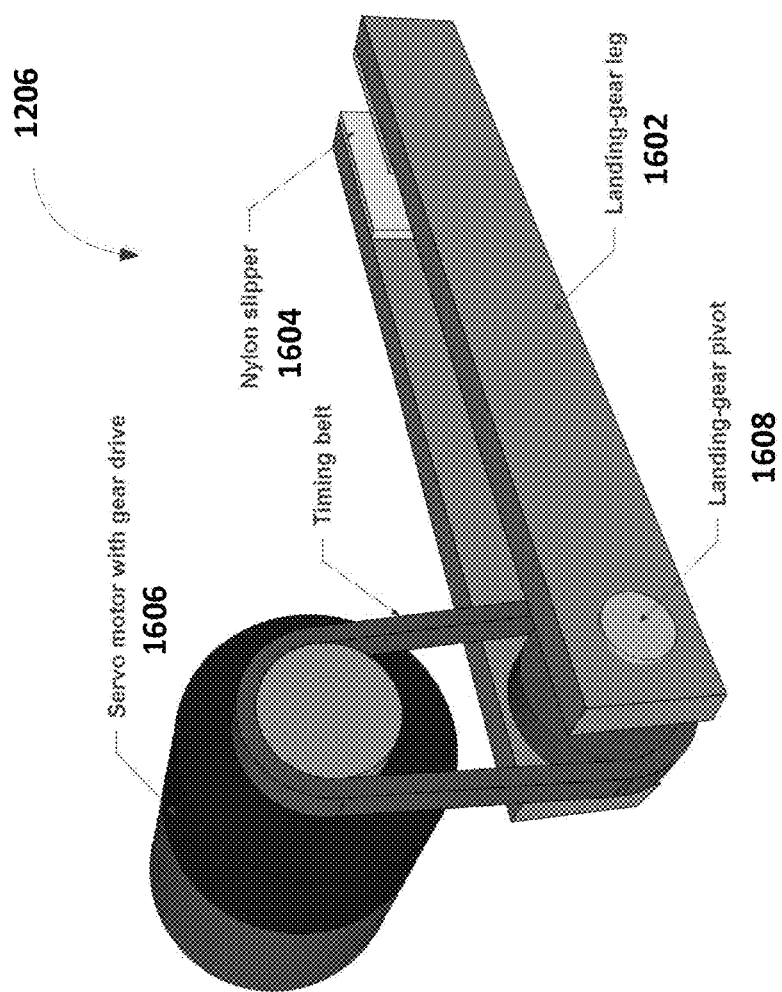
FIG. 16 is a perspective view of an aileron assembly for the tube vehicle of FIG. 1 according to some aspects of the disclosure.

The vehicle 100 may further include a landing gear assembly 1206 that allows for the vehicle to take off and to stop and to be held upright when the speed of the vehicle falls below a minimum speed ($V_{min}$) or when the vehicle is at rest. The vehicle includes longitudinally arranged wheels that may not balance the vehicle at slow speeds or at rest; therefore the vehicle includes landing gear to allow the vehicle to reach the proper speed for the ailerons to balance the vehicle, after which the landing gear may be retracted. In particular, the landing gear is designed to grasp two faces of the rail to steady the vehicle. As shown in more detail in FIG. 16, the landing gear 1206 includes a landing-gear leg 1602, coupled to a servo motor with a gear drive 1606, which includes a pad ("slipper") of low-friction material such as Nylon, Teflon, or similar material, or includes small wheels, that together press against the face of the rail support structure and hold the vehicle substantially vertical. When the vehicle 100 needs to be brought to a stop, the landing gear, driven by the motor 1606, engages the rail or the rail support structure, thereby stabilizing the vehicle on the rail. Alternatively, the landing gear may be operated by hydraulic or pneumatic power. In one particular implementation, the vehicle 100 may also include a parking brake. The landing gear pads may also squeeze the faces of the rail and thereby serve as a brake.

Although one or more of the embodiments disclosed herein may be described in detail with reference to a particular vehicle, the embodiments should not be interpreted or otherwise used as limiting the scope of the disclosure, including the claims. In addition, one skilled in the art will understand that the following description has broad application. For example, while embodiments disclosed herein may focus on certain vehicles, such as a propeller-driven vehicle, it should be appreciated that the concepts disclosed herein equally apply to other transportation methods. For example, the concepts disclosed herein may be employed in automobiles, trains, and aircraft. In addition, it should be appreciated that the concepts disclosed herein may equally apply to non-transportation related items, such as manufacturing and scientific laboratory apparatus. Furthermore, while embodiments disclosed herein may focus on a gas-filled operating atmosphere, the concepts disclosed herein equally apply to other operating atmospheres, such as air. Accordingly, the discussion of any embodiment is meant only to be exemplary and is not intended to suggest that the scope of the disclosure, including the claims, is limited to these embodiments.

The invention claimed is:

1. A transportation system comprising:
a substantially enclosed conduit provided between a first geographic location and a second geographic location, the enclosed conduit having a cross-section of a fluted tube and being provided with an atmosphere that allows a vehicle traveling within the enclosed conduit to achieve aerodynamic tunneling, the cross-section having a curve outlining one or more lobes and one or more waists, the cross-section being defined by a polar-coordinate equation $r=a+b \cos^2 ct$, wherein r is a distance of a point on the curve from a pole, t is an angle in a polar coordinate system, c is an integral multiple of ½, and a and b are real parameters, wherein none of a, b and c is zero, and wherein the atmosphere inside the enclosed conduit has a density such that a speed of sound is greater than a speed of sound of atmospheric air outside of the enclosed conduit.

2. The transportation system of claim 1 further comprising a plurality of wheels configured to support the vehicle on a support and guide structure of the conduit.

3. The transportation system of claim 2 wherein:
the support and guide structure defines a rail; and
wherein the plurality of wheels are aligned along a longitudinal centerline of the vehicle and include an opposing side flanges that laterally constrain the wheels on the rail.

4. The transportation system of claim 2 wherein each of the plurality of wheels includes an aerostatic bearing spindle and a bearing housing, the aerostatic bearing spindle including a plurality of orifices that provide gas flow to a gap between the aerostatic bearing spindle and the bearing housing, wherein the gas flow supports the plurality of wheels.

5. The transportation system of claim 1 wherein the fluted tube is formed from two or more tubes conjoined along their entire lengths, and wherein the conjoined tubes share their collective cross-sectional areas and thereby reduce aerodynamic drag.

6. The transportation system of claim 5 wherein the cross-sectional area includes a plenum that is a central circular region of the fluted tube, the plenum having a circular cross-section of radius $r=a$.

7. The transportation system of claim 1 wherein the enclosed conduit is configured to support bidirectional or parallel traffic.

8. The transportation system of claim 1 wherein the enclosed conduit further includes at least one guideway configured to support and guide a vehicle traveling within the conduit.

9. The transportation system of claim 1 wherein an overall gas efficacy of the atmosphere provided within the enclosed conduit is higher than a gas efficacy of air outside of the conduit.

10. The transportation system of claim 1 wherein the atmosphere provided within the enclosed conduit is $H_2$, $NH_3$, $CH_4$, He, $C_2H_2$, $C_2H_6$, $C_3H_8$, $C_2H_4$, $N_2$, $CO_2$, $N_2O$, $O_2$, $SF_6$, Ar, Ne, halocarbons, or any mixture of these gases.

11. The transportation system of claim 1 wherein the vehicle is propelled by at least one of magnetic propulsion or a propeller, and wherein the atmosphere provided in the conduit comprises density stages, the density stages including gases of decreasing densities along a length of the enclosed conduit, in a direction of vehicle acceleration wherein each density stage is separated from another density stage by at least one movable partition that allows the vehicle to traverse from one density stage to another density stage.

12. The transportation system of claim 11 further comprising gases of increasing density in a direction of deceleration wherein each density stage is separated from another density stage by at least one movable partition that allows the vehicle to traverse from one density stage to another density stage.

13. The transportation system of claim 1 wherein the atmosphere provided in the conduit comprises density stages, the density stages including gases of increasing density in a direction of deceleration, wherein each density stage is separated from another density stage by at least one movable partition that allows the vehicle to traverse from one density stage to another density stage.

14. The transportation system of claim 1 further including at least one vehicle dimensioned to fit within the conduit, the vehicle comprising a propulsion system and a system configured to support and guide the vehicle within the enclosed conduit.

* * * * *